(12) United States Patent
Yushin et al.

(10) Patent No.: US 10,741,845 B2
(45) Date of Patent: Aug. 11, 2020

(54) STABLE LITHIUM FLUORIDE-BASED CATHODES FOR METAL AND METAL-ION BATTERIES

(71) Applicant: Sila Nanotechnologies Inc., Alameda, CA (US)

(72) Inventors: Gleb Yushin, Atlanta, GA (US); Eugene Berdichevsky, Oakland, CA (US); Bogdan Zdyrko, Clemson, SC (US); Alexander Jacobs, Oakland, CA (US); Daniel Gordon, Oakland, CA (US); Nicholas Ingle, Berkeley, CA (US); Laura Gerber, Oakland, CA (US)

(73) Assignee: SILA NANOTECHNOLOGIES INC., Alameda, CA (US)

(*) Notice: Subject to any disclaimer, the term of this patent is extended or adjusted under 35 U.S.C. 154(b) by 428 days.

(21) Appl. No.: 15/209,619

(22) Filed: Jul. 13, 2016

(65) Prior Publication Data
US 2017/0018768 A1   Jan. 19, 2017

Related U.S. Application Data

(60) Provisional application No. 62/191,872, filed on Jul. 13, 2015.

(51) Int. Cl.
*H01M 4/36* (2006.01)
*H01M 4/38* (2006.01)
(Continued)

(52) U.S. Cl.
CPC ............ *H01M 4/625* (2013.01); *H01M 4/13* (2013.01); *H01M 4/362* (2013.01); *H01M 4/366* (2013.01);
(Continued)

(58) Field of Classification Search
CPC .......... H01M 4/13; H01M 4/362; H01M 4/38; H01M 4/582; H01M 4/625; H01M 10/0525
See application file for complete search history.

(56) References Cited

U.S. PATENT DOCUMENTS

| 5,512,387 A | 4/1996 | Ovshinsky |
| 2010/0143798 A1 | 6/2010 | Zhamu et al. |

(Continued)

FOREIGN PATENT DOCUMENTS

| JP | 2013080637 A | 5/2013 |
| WO | 2013183522 A1 | 12/2013 |
| WO | 2004051772 A2 | 6/2014 |

OTHER PUBLICATIONS

International Search Report and Written Opinion dated Nov. 4, 2016 in International Application No. PCT/US2016/042160.

*Primary Examiner* — Brittany L Raymond
(74) *Attorney, Agent, or Firm* — Muncy, Geissler, Olds & Lowe, P.C.; Daniel Podhajny

(57) ABSTRACT

A battery electrode composition is provided that comprises composite particles. Each composite particle may comprise, for example, active lithium fluoride/metal nanocomposite material optionally embedded into a nanoporous, electrically-conductive skeleton matrix material particle(s), where each of these composite particles is further encased in a Li-ion permeable, chemically and mechanically robust, protective outer shell that is impermeable to electrolyte solvent molecules. The active lithium fluoride/metal nanocomposite material is provided to store and release Li ions during battery operation.

21 Claims, 22 Drawing Sheets

(51) Int. Cl.
    *H01M 4/58*         (2010.01)
    *H01M 4/62*         (2006.01)
    *H01M 10/0525*    (2010.01)
    *H01M 4/13*         (2010.01)
    *H01M 4/583*       (2010.01)

(52) U.S. Cl.
    CPC ............ *H01M 4/38* (2013.01); *H01M 4/388* (2013.01); *H01M 4/582* (2013.01); *H01M 4/5835* (2013.01); *H01M 10/0525* (2013.01)

(56) References Cited

U.S. PATENT DOCUMENTS

| | | |
|---|---|---|
| 2012/0032118 A1 | 2/2012 | Fichtner et al. |
| 2012/0202112 A1 | 8/2012 | Yushin et al. |
| 2012/0251886 A1 | 10/2012 | Yushin et al. |
| 2012/0321959 A1 | 12/2012 | Yushin et al. |
| 2012/0321961 A1 | 12/2012 | Yushin et al. |
| 2012/0328952 A1 | 12/2012 | Yushin et al. |
| 2013/0224594 A1* | 8/2013 | Yushin .................... H01M 4/38 |
| | | 429/218.1 |
| 2013/0344391 A1 | 12/2013 | Yushin et al. |
| 2014/0057179 A1 | 2/2014 | Yushin et al. |
| 2014/0170476 A1 | 6/2014 | Tan et al. |
| 2014/0170503 A1 | 6/2014 | Yushin et al. |
| 2014/0287301 A1 | 9/2014 | Yushin et al. |
| 2014/0349183 A1* | 11/2014 | Macklin ................ H01M 4/131 |
| | | 429/213 |
| 2015/0064568 A1 | 3/2015 | Yushin et al. |
| 2015/0155546 A1* | 6/2015 | Yushin ................ H01M 4/0447 |
| | | 427/78 |
| 2015/0236372 A1 | 8/2015 | Yushin et al. |
| 2015/0349346 A1 | 12/2015 | Yushin et al. |
| 2016/0104882 A1 | 4/2016 | Yushin et al. |

\* cited by examiner

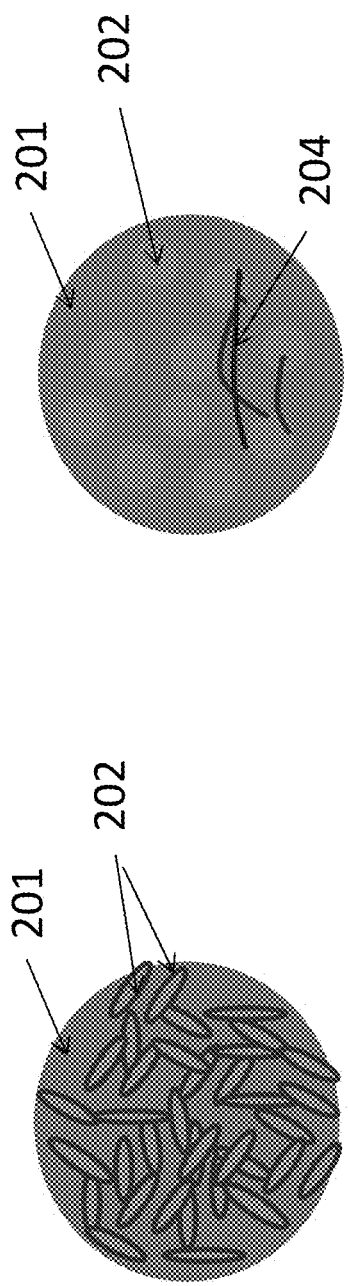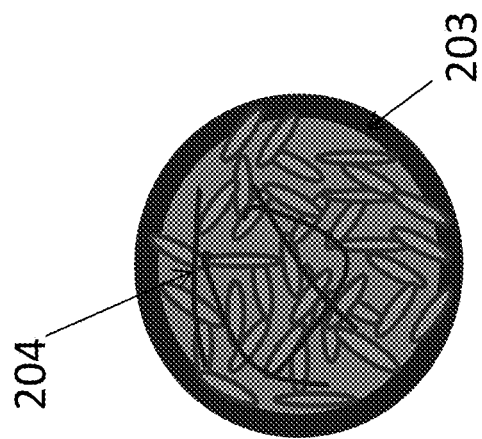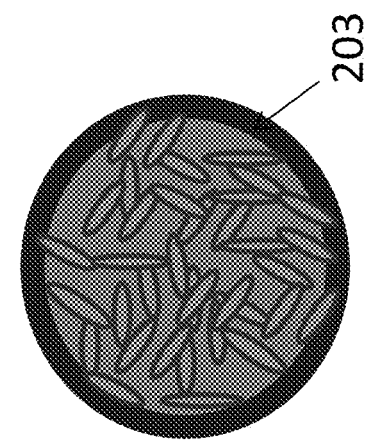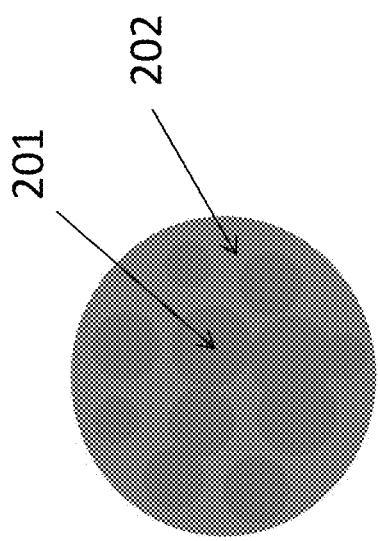
FIG. 2A
FIG. 2B
FIG. 2C
FIG. 2D
FIG. 2E

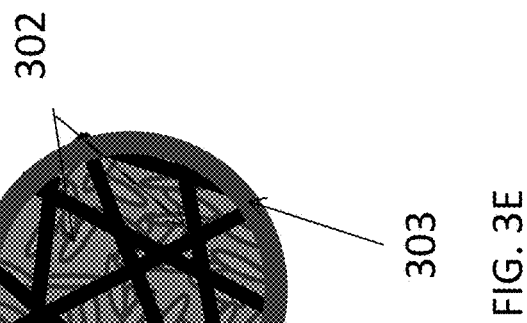
FIG. 3E
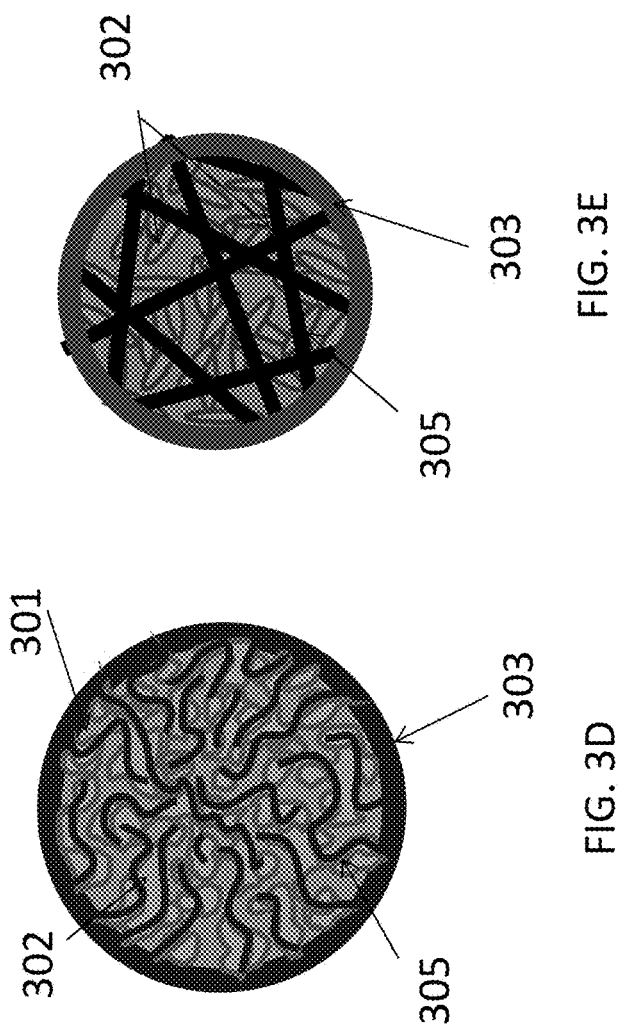
FIG. 3B
FIG. 3D
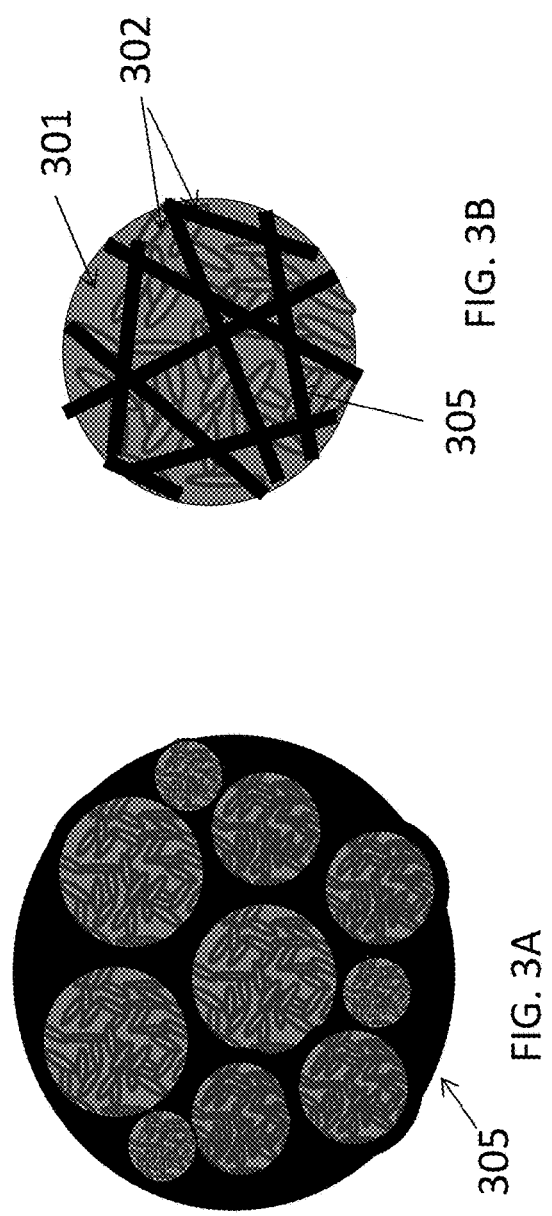
FIG. 3A
FIG. 3C

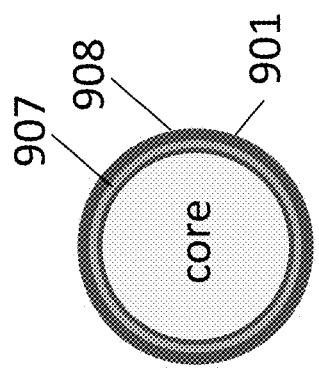
FIG. 9A
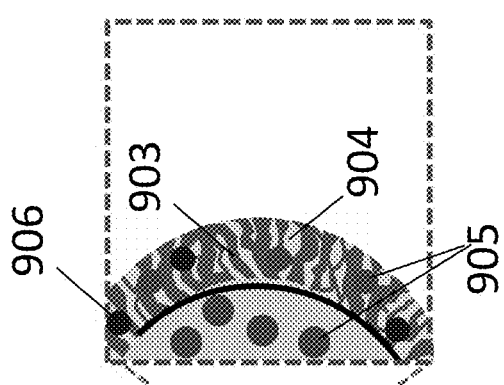
FIG. 9B
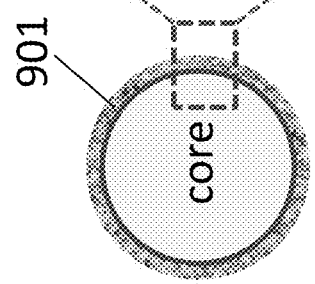
FIG. 9C
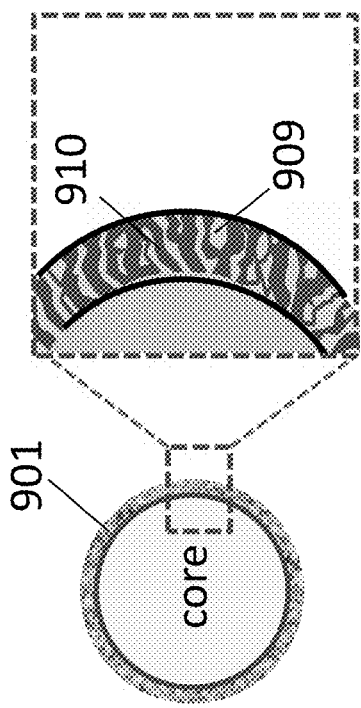
FIG. 9D
FIG. 9E
FIG. 9F
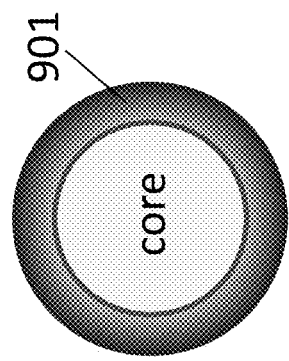
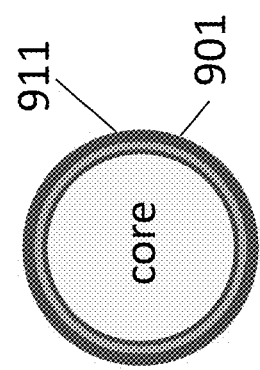

STABLE LITHIUM FLUORIDE-BASED CATHODES FOR METAL AND METAL-ION BATTERIES

CLAIM OF PRIORITY UNDER 35 U.S.C. § 119

The present application for patent claims the benefit of U.S. Provisional Application No. 62/191,872, entitled "Stable Lithium Floride-Based Cathodes for Metal and Metal-Ion Batteries," filed Jul. 13, 2015, which is expressly incorporated herein by reference in its entirety.

GOVERNMENT LICENSE RIGHTS

This invention was made with government support under Award ID DE-EE0006862 awarded by the Office of Energy Efficiency and Renewable Energy (EERE) within the United States Department of Energy (DOE). The government has certain rights in the invention.

BACKGROUND

Field

The present disclosure relates generally to energy storage devices, and more particularly to metal and metal-ion battery technology and the like.

Background

Owing in part to their relatively high energy densities, relatively high specific energy, light weight, and potential for long lifetimes, advanced rechargeable metal batteries and rechargeable metal-ion batteries such as lithium-ion (Li-ion) batteries are desirable for a wide range of consumer electronics, electric vehicle, grid storage and other important applications. Similarly, primary metal and metal-ion batteries, such as primary Li batteries, are desired for a range of applications, where high energy density and/or high specific energy of batteries is needed, even if the batteries may be disposed of after a single use.

However, despite the increasing commercial prevalence of Li-ion batteries and some of the Li primary batteries, further development of these batteries is needed, particularly for potential applications in low- or zero-emission, hybrid-electrical or fully-electrical vehicles, consumer electronics, energy-efficient cargo ships and locomotives, aerospace applications, and power grids.

Conversion-type electrodes, such as metal fluorides, metal chlorides, metal iodides, metal sulfides, sulfur, oxides, metal nitrides, metal phosphides, metal hydrides and others for Li-ion batteries offer high gravimetric and volumetric capacities. In these electrodes, so-called conversion reactions take place when metal ions such as Li are inserted or extracted during battery operation. For example, an iron fluoride (e.g., $FeF_2$) is converted to $2LiF$ and $Fe$ during an electrochemical reaction of $FeF_2$ with Li ions during Li-ion or Li cell discharge.

Metal fluorides, in particular, offer a combination of relatively high average voltage and high capacities, but suffer from several limitations for various metal-ion (such as Li-ion) battery chemistries. For example, only select metal fluoride particles have been reported to offer some reasonable (although still poor) cycle stability in Li-ion battery cells (specifically $AgF_2$, $FeF_2$, $FeF_3$, $CoF_2$, and $NiF_2$). Many other metal fluorides are generally believed not to be practical for applications in Li-ion batteries due to the irreversible changes that occur in such cathodes during battery operation. For example, during Li-ion insertion into some of the other fluorides (such as $CuF_2$, for example) and the subsequent formation of LiF during the conversion reaction, the original fluoride-forming element (such as Cu in the case of $CuF_2$) produces electrically isolated (Cu) nanoparticles. Being electrically isolated, such nanoparticles cannot electrochemically react with LiF to transform back into $CuF_2$ during subsequent Li extraction, thereby preventing reversibility of the conversion reaction. As a result, after a discharge, the cell cannot be charged back to the initial capacity. In addition to formation of electrically isolated nanoparticles, the irreversible growth of LiF and metal (M) clusters during cycling and the resulting growth of resistance may be yet another serious limitation. This additionally limits the rate performance of such chemistries. Moreover, many attractive (in terms of high theoretical energy density) metal fluorides (such as $CuF_2$) suffer from another degradation mechanism: during Li (or Li-ion) battery operation, the cathode is often exposed to a potential level where a metal (of the corresponding metal fluoride) is oxidized and initially dissolves into the electrolyte, then migrates to the anode and reduces on the anode. This process leads to rapid irreversible capacity losses and cell degradation and may be particularly serious for some of the most otherwise-attractive metal fluoride cathode materials (such as $CuF_2$-based cathodes). Metal chlorides suffer from similar limitations. But in addition, their dissolution during cycling induces formation of Cl-containing ions that corrode cathode current collectors.

Even the cathodes based on those metal fluorides that are believed to be most practical due to their relatively reversible operation and reasonably low cost (such as $FeF_2$, $FeF_3$, $CoF_2$, and $NiF_2$), suffer from multiple limitations including: (i) low electrical conductivity, which limits their utilization and both energy and power characteristics in batteries; (ii) low ionic conductivity, which limits their utilization and both energy and power characteristics in batteries; and (iii) volume expansion during Li-ion insertion, which may cause mechanical and electrical degradation in the electrodes during battery operation.

As a result, despite multiple theoretical advantages of fluoride-based cathodes (and some of the chloride-based cathodes), for example, their practical applications in metal-ion batteries are difficult to achieve. The cells produced with fluoride-based cathodes currently suffer from poor stability, volume changes, slow charging, and high impedance.

Several approaches have been developed to overcome some of the above-described difficulties, but none have been fully successful in overcoming all of them.

For example, decreasing particle size decreases the ion diffusion distance, and offers one approach to addressing the low ionic conductivity limitation. However, nanopowders suffer from high electrical resistance caused by the multiple, highly resistive point contacts formed between the individual particles. In addition, small particle size increases the specific surface area available for undesirable electrochemical (or chemical) side reactions. Furthermore, simply decreasing the particle size does not address and may in some cases exacerbate other limitations of such materials, such as volume changes as well as weakening of the particle-binder interfaces. Moreover, in contrast to using micron-scale particles for cathode formulations, handling nanoparticles and using them to prepare dense electrodes is technologically difficult. Nanoparticles are difficult to disperse uniformly within conductive carbon additives and the binder of the cathode, and an undesirable formation of agglomerates of nanoparticles tends to take place. Formation of such agglomerates reduces the electrode density (thus reducing volume-normalized capacity and energy density of the cells), reduces electrode stability (since the binder and conductive additives do not connect individual particles within such agglomerates) and reduces capacity utilization (since some of the nanoparticles become electrically insulated and thus do not participate in Li-ion storage).

In another approach, select metal fluoride particles which offer some reasonable cycle stability in Li-ion battery cells (specifically $FeF_2$, $FeF_3$, $CoF_2$, and $NiF_2$) may be mechanically mixed with or deposited onto the surface of conductive substrates, such as carbon black, graphite, multi-walled carbon nanotubes, or carbon fibers. In this case, the high electrical conductivity of the carbon enhances electrical conductivity of the electrodes. However, many degradation mechanisms (including those discussed above) are not addressed by this approach. In addition, the phase transformations during battery operation and the volume changes discussed above may induce a separation of the active material from the conductive additives, leading to resistance growth and battery degradation.

In yet another approach, select metal fluoride particles (specifically $FeF_2$ particles) may be coated with a solid multi-walled graphitic carbon shell layer. In this case, the electrical conductivity of a metal fluoride cathode may be improved. However, the above-described volume changes during metal-ion insertion may break the graphitic carbon coating and induce irreversible capacity losses. Similarly, the phase transformation during subsequent charging and discharging cycles may induce a separation of the active material from the graphitic carbon shell, leading to resistance growth and battery degradation. Furthermore, some of the carbon shells are incredibly difficult to deposit on selected metal fluorides (such as copper fluorides) and chlorides due to the simultaneous metal fluoride reduction (for example, reduction of $Cu^{2+}$ in $CuF_2$ to metallic $Cu^0$)

Accordingly, there remains a need for improved metal and metal-ion batteries, components, and other related materials and manufacturing processes.

SUMMARY

Embodiments disclosed herein address the above stated needs by providing improved battery components, improved batteries made therefrom, and methods of making and using the same.

Li or Li-ion battery electrode compositions are provided that comprise composite particles fabricated according to the techniques herein (which may represent all or a subset of the composite particles in a given electrode). Each such composite particle may include, for example, a mixture of metal and lithium fluoride (LiF) materials, a skeleton matrix material, and a Li-ion permeable shell. The mixture of metal and LiF materials may be provided to store and release Li ions during battery operation. The mixture of metal and LiF materials may be embedded into the scaffolding matrix to form an active material core. The Li-ion permeable shell may at least partially encase the active material core and protect the metal and LiF materials from interaction with a battery electrolyte.

The composite particles may be of a substantially-spherical shape and exhibit an average diameter in the range of about 50 nm to about 10 microns. The Li-ion permeable shell may have an average shell thickness among the composite particles in the range of about 1 nm to about 100 nm.

The skeleton matrix material may make up an average volume fraction among the composite particles in the range of about 3 vol. % to about 40 vol. %. Moreover, in some designs, the volume fraction of the skeleton matrix material near the perimeter of each composite particle may be on average at least 10% larger than in the center of each composite particle. The skeleton matrix material may be in the form of a monolithic particle. The skeleton matrix material may comprise, for example, about 20 at. % to about 100 at. % carbon. The skeleton matrix material may comprise more than about 0.05 at. % fluorine.

The metal of the mixture may comprise, for example, 10-100 at. % Cu and 0-90 at. % of at least one of the following: Fe, Co, Ni, Ti, Zn, Bi, Pb, Sb, Sn, Cd, Cr, Zr, Nb, Mo, Hf, Ta, Si, La, or Ce.

The Li-ion permeable shell may be a composite material that has at least two components. The Li-ion permeable shell may comprise about 20 at. % to about 100 at. % carbon. Each composite particle may further comprise one or more functional groups forming a coating on the Li-ion permeable shell.

A Li or Li-ion battery is also provided that comprises anode and cathode electrodes, with the cathode electrode comprising the battery electrode composition of claim 1. The battery may also include an electrolyte ionically coupling the anode and the cathode electrodes, and a separator electrically separating the anode and the cathode electrodes.

A method of fabricating a Li or Li-ion battery electrode composition comprising composite particles is also provided. For each composite particle (which again may represent all or a subset of all composite particles in a given electrode) may comprise, for example, embedding one or more metal, metal oxide, or metal salt precursors into a skeleton matrix material; inducing conversion of the one or more precursors into a metal fluoride embedded into the skeleton matrix material via a fluorination reaction to form an active material core; and at least partially encasing the active material core with a Li-ion permeable shell to protect the active material core from interaction with a battery electrolyte.

The one or more precursors may comprise, for example, a mixture of least two different precursor compositions.

A plasma source may be utilized for the formation of fluorine radicals involved in the fluorination reaction.

The method may further comprise, in some designs, chemical lithiation of the metal fluoride embedded into the skeleton matrix material. The chemical lithiation may proceed by using one or more chemical lithiation reagents that are soluble in organic solvents. The one or more chemical lithiation reagents may comprise, for example, at least one of the following: (i) a lithium alkylborohydride (including lithium triethylborohydride), (ii) an alkyllithium magnesite (including tri-n-butyllithium magnesate and lithium dibutyl (isopropyl)magnesate), (iii) a radical anion of polycyclic aromatic hydrocarbons (including lithium naphthalene radical anion and lithium anthracene radical anion), (iv) a lithium ketone radical anion (including lithium benzophenone ketyl), or (v) a lithium aluminum hydride. In addition or as an alternative, the one or more chemical lithiation reagents may also comprise (i) lithium borohydride or (ii) an alkyllithium reagent (such as tri-sec-butylborohydride, n-butyllithium, sec-butyllithium, and tert-butyllithium). The fluorination reaction may comprise, for example, using a non-lithium-containing reducing agent to reduce metal ions in a metal fluoride composition to a corresponding metallic state and a separate lithium-containing salt to provide lithium ions to form lithium fluoride (LiF).

BRIEF DESCRIPTION OF THE DRAWINGS

The accompanying drawings are presented to aid in the description of embodiments of the invention and are provided solely for illustration of the embodiments and not limitation thereof.

FIGS. 2A-2E illustrate examples of suitable architectures for composite particles comprising intermixed metal (M) and LiF materials.

FIGS. 3A-3E illustrate examples of suitable architectures for composite particles comprising intermixed metal (M) and LiF materials embedded in a skeleton matrix material.

FIGS. 9A-9F illustrate examples of suitable architectures for shells at least partially encasing the composite particles comprising intermixed metal (M) and LiF materials.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

While the description below may describe certain examples in the context of Li and Li-ion batteries (for brevity and convenience, and because of the current popularity of Li technology), it will be appreciated that various aspects may be applicable to other rechargeable and primary, metal and metal-ion batteries (such as Na-ion, Mg-ion, K-ion, Ca-ion, Al-ion, and others). Further, while the description below may also describe certain examples of the material formulations in a Li-free (e.g., charged) state, it will be appreciated that various aspects may be applicable to Li-containing electrodes (e.g., in either a partially or fully discharged state).

Similarly, while the description below may describe certain examples in the context of LiF chemistry, it will be appreciated that various aspects may be applicable to other lithium halide chemistries (such as LiCl, for example).

Figure 1:
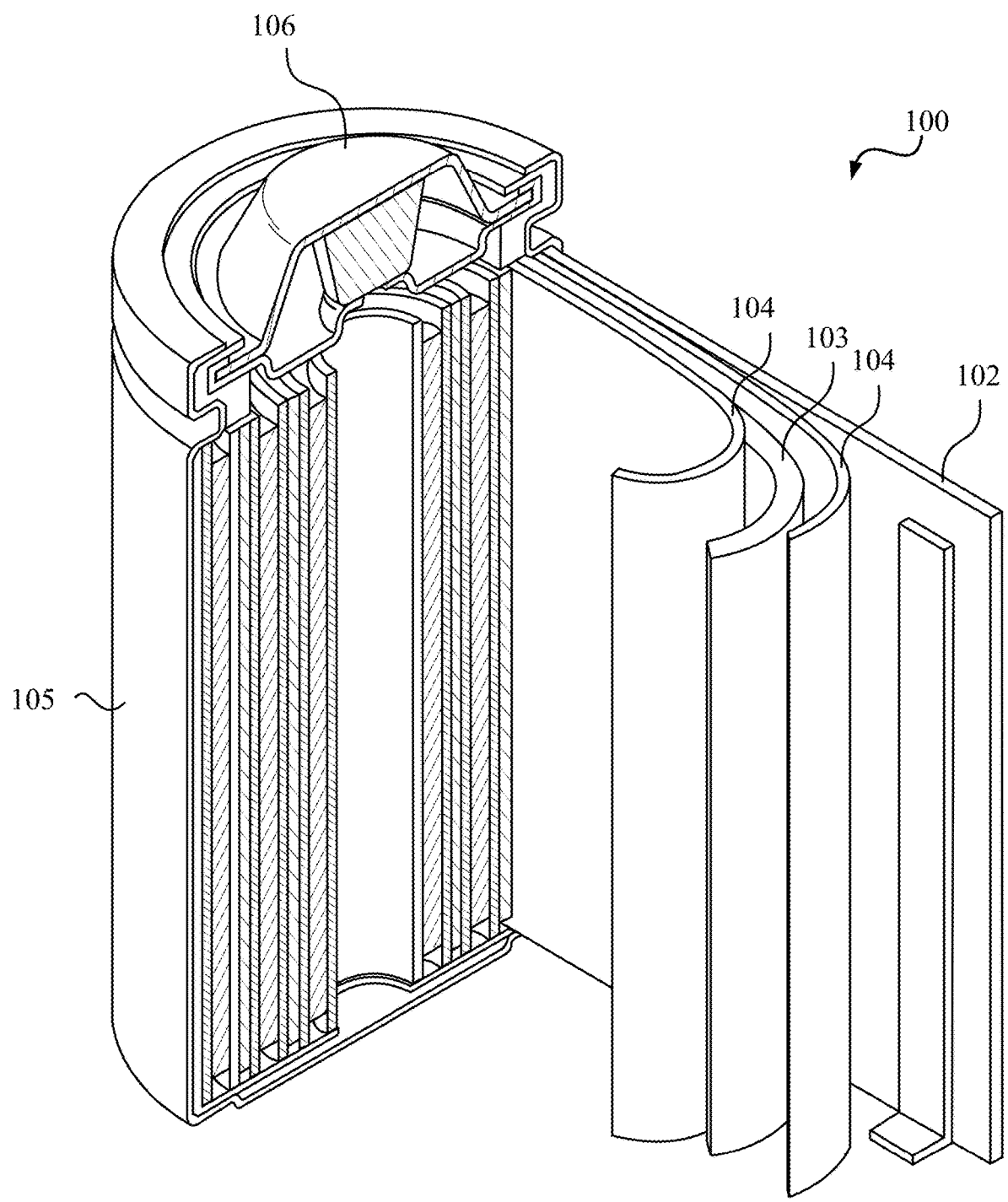
FIG. 1 illustrates an example metal-ion (e.g., Li-ion) battery in which the components, materials, methods, and other techniques described herein, or combinations thereof, may be applied according to various embodiments.

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown) impregnating the separator 104, a battery case 105, and a sealing member 106 sealing the battery case 105.

Both liquid and solid electrolytes may be used for the designs herein. Conventional liquid electrolytes for Li- or Na-based batteries of this type are generally composed of a single Li or Na salt (such as $LiPF_6$ for Li-ion batteries and $NaPF_6$ or $NaClO_4$ salts for Na-ion batteries) in a mixture of solvents (such as a mixture of carbonates). The most common salt used in a Li-ion battery electrolyte, for example, is $LiPF_6$, while less common salts include lithium tetrafluoroborate ($LiBF_4$), lithium perchlorate ($LiClO_4$), lithium bis (oxalato)borate ($LiB(C_2O_4)_2$, lithium difluoro(oxalate)borate ($LiBF_2(C_2O_4)$), various lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others) and others. Electrolytes for Mg-ion, K-ion, Ca-ion, and Al-ion batteries are often more exotic as these batteries are in earlier stages of development. They may comprise different salts and solvents (in some cases, ionic liquids may replace organic solvents for certain applications).

In addition, solid electrolytes may provide some advantages for fluoride-based cathodes, such as stability against oxidation at high cathode potentials, reduced undesirable side reactions between the cathode and electrolyte, as well as enhanced safety. Examples of the solid ceramic electrolytes include sulfide-based electrolytes (such as $Li_2S$—$P_2S_5$, $Li_2S$—$Ga_2S_3$—$GeS_2$, $Li_2S$—$SiS_2$, etc.), halide-based electrolytes, lithium-oxy-halide and lithium-metal-oxy-halide based electrolytes (e.g., $Li_3$—O—Cl, $Li_3$—O—$Cl_{0.5}I_{0.5}$, $Li_2$—H—O—$Cl_{0.5}Br_{0.5}$, $Li_{1.5}$—$H_{0.5}$—$Al_{0.3}$—O—$Cl_{0.5}Br_{0.5}$, etc.), oxide-based electrolytes (such as Li—La—Ti—O garnet, Li—La—Ta—O garnet, Li—Si—O glass, Li—Ge—O glass, $Li_9SiAlO_8$, etc.), mixed sulfide-oxide electrolytes (such as $Li_2S$—$SiS_2$—$Li_4SiO_4$, LiI—$La_2O_2S$—$La_2O_2S_2$, etc.), and many others. The use of solid electrolytes with conversion-based cathodes has been hindered by the inability of ceramics to accommodate the volume changes that take place during charge and discharge cycling. Their use with fluoride-based cathodes has been particularly difficult because fluoride-based active cathode particles exhibit large volume changes.

Conventional cathode materials utilized in metal-ion batteries are of an intercalation-type. Metal ions are intercalated into and occupy the interstitial positions of such materials during the discharge of a battery. However, such cathodes exhibit small gravimetric and more importantly small volumetric capacities: typically less than around 220 mAh/g active material and less than around 700 mAh/cm³ at the electrode level, respectively. This low capacity of intercalation-type cathodes limits the energy density and specific energy of metal-ion batteries.

Fluoride-based cathodes may offer outstanding technological potential due to their very high capacities, in some cases exceeding 300 mAh/g (and greater than 1200 mAh/cm³ at the electrode level). For example, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; and $ZnF_2$ offers a theoretical specific capacity of 519 mAh/g.

In addition, in cases where the fluoride-forming element is inexpensive, fluoride-based cathodes offer a low cost potential as well. The 5-year averaged wholesale commodity cost of many fluoride-forming elements is reasonably low. For example, in 2013, the cost of Fe was only around $0.2/kg; the cost of Cu was only around $4-9/kg; the cost of Zn was only around $1-2/kg; the cost of Cd was only around $1/kg; the cost of Pb was only around $1-2/kg; and the cost of Sb was only around $6-15/kg.

However, many fluorides with high theoretical capacity and high theoretical energy density (such as $CuF_2$, $NiF_2$, $PbF_2$, $BiF_3$, $BiF_5$, $SnF_2$, $SnF_4$, $SbF_3$, $CdF_2$, $ZnF_2$, and others) have been believed not to be practical for use in rechargeable Li-ion batteries due to the previously observed lack of stability and very large polarizations experimentally observed when they were used in conventional cathode configurations, where metal fluorides were mechanically mixed with carbon additives or deposited on the outer surface of carbon particles.

One advantage of some of these so-called "impractical" fluorides (such as $CuF_2$, $PbF_2$, $SnF_2$, $CdF_2$, $ZnF_2$, and others) over more generally used (and still not very practical) $FeF_2$ and $FeF_3$ is a more flat discharge curve and often (e.g. in case of $CuF_2$) higher energy density.

In contrast to the small structural, chemical, and volumetric differences observed during insertion/extraction of Li ions into/out of so-called intercalation cathode compounds (where Li is inserted/intercalated into the interstitials of the intercalation crystals), fluorides exhibit dramatic structural changes and significant volume changes accompanying cell cycling. During electrochemical Li insertion into a metal fluoride-based cathode, a displacement/conversion process takes place, where Li displaces solid fluoride-forming element(s) (such as metals or semimetals, or in some cases semiconductors), leading to the formation of solid LiF and clusters of the fluoride-forming element(s), typically only 2-10 nanometer in size. Theoretically, the Li capacity of fluorides is determined by their stoichiometry and the density of the fluoride-forming metal according to the following reaction (which assumes fully reversible electrochemical transformation during charge and discharge):

$$x\text{Li}^+ + xe^- + \text{MF}_x \leftrightarrow x\text{LiF} + \text{M} \quad \text{(Eq. 1)}$$

where M is a fluoride-forming element.

Mechanistically, it is believed that initial insertion of Li into some of the metal fluorides with metals possessing a higher oxidation state (such as $FeF_3$) takes place as intercalation. For example, during electrochemical reaction of Li with $FeF_3$, Li first intercalates into the structure forming:

$$\text{Li}^+ + e^- + \text{FeF}_3 \rightarrow \text{LiFeF}_3 \quad \text{(Eq. 2)}$$

Only after additional Li insertion, a conversion reaction transforms the reaction products to LiF and interconnected Fe nanoparticles according to:

$$2\text{Li}^+ + 2e^- + \text{LiFeF}_3 \rightarrow 3\text{LiF} + \text{Fe} \quad \text{(Eq. 3)}$$

As discussed in the background above, conventional fluoride cathodes may suffer from limitations, such as (i) low electrical conductivity; (ii) low ionic conductivity, and (iii) volume expansion during electrochemical lithiation and formation of LiF and metal clusters. Other limitations include (iv) gas generation during fluoride reactions with electrolytes (particularly at high potentials), which may cause battery degradation; (v) formation of surface species during surface reactions with the electrolyte, which may increase resistance and reduce reversibility of electrochemical reactions; (vi) oxidation of metals and dissolution of the metal fluorides during cycling, which may increase resistance, damage the solid electrolyte interphase (SEI) layer on the anode, and reduce both the power performance and cycle stability of battery cells; (vii) irreversible changes within their structure during battery operation (such as irreversible growth of the LiF and metal clusters/nanoparticles), which may also lead to irreversible resistance growth capacity losses; and (viii) the need to couple a metal fluoride-comprising cathode with a reactive and difficult to handle Li-comprising anode to form a functional cell. The present disclosure allows one to overcome some of the above-discussed above challenges and produce stable, high capacity, high energy density fluoride-based cathodes.

Formation of suitable protective shells around the electrode or around the individual particles comprising metal fluoride material may overcome at least some of the above-discussed limitations, but often not all of them (for example, a core-shell material may still require the use of Li-containing anodes). Furthermore, formation of shells is often challenging, expensive, insufficiently reliable (for achieving stability during cycling or storage, particularly at a partially or fully discharged state) and potentially dangerous. For example, formation of various shells around $CuF_2$-comprising material (particularly at temperatures above 60° C. in an HF-free or F-free environment) generally results in undesirable reactions, such as conversion of $CuF_2$ into a Cu metal, HF vapors, $F_2$ gas, or various other fluorinated compounds (depending on the particular chemical synthesis route utilized for the shell deposition). The use of an HF- or F-gaseous environment may help to prevent $CuF_2$ decomposition or conversion reactions in some cases, but it significantly increases the fabrication cost and potential hazard during this operation. Even once formed, the produced protective shells may become broken during cell operation if the expansion (induced by electrochemical lithiation of the electrodes) induces stresses sufficiently large to initiate cracks and fractures in the shell during the initial or the subsequent cycles (fatigue). Once broken, the shells do not provide the requisite stabilization against side reactions. The present disclosure provides synthesis routes to overcome such challenges and deposit suitable coatings that may better withstand stresses during battery cycling.

Embedding metal fluoride material into a suitable skeleton matrix material and thus forming fluoride-comprising composites provides complimentary advantages. This approach and particle architecture may reduce volume changes in particles and electrodes during cell operation. This approach and particle architecture may significantly reduce irreversible changes in the electrode during cycling (for example, by preventing irreversible growth of metal clusters) and thus reduce cell degradation and resistance growth. This approach and particle architecture may significantly reduce ionic and/or electrical resistance of the cathode particles. However, for some of the metal fluoride materials (for example, for $CuF_2$) formation of such particle architecture may be challenging, expensive, or dangerous. The present disclosure provides not only the advantageous architecture of the composites, but also describes advanced approaches for suitable formation of such composite particles, where fluorides are imbedded into the skeleton matrix materials.

The present disclosure provides for advanced composite materials for battery electrodes comprising fluorides as active material(s). Instead of the traditionally used transition metal fluorides (such as $FeF_2$, $FeF_3$, $CoF_2$, and $NiF_2$), the disclosed composite materials may comprise lithium fluoride (LiF) intermixed with clusters or nanoparticles of metal(s) or metal alloy(s). This particle architecture may provide the following advantages: (i) the material does not expand significantly since Li is already present in these cathodes; (ii) the cathodes comprising such composite particles may be matched with Li-free anodes (such as graphite anodes, Si-comprising anodes, Sn-comprising anodes, etc.); and (iii) formation of protective shells around such particles is significantly more straightforward and cheaper because LiF is significantly more stable and less reactive than many other metal fluorides (in particularly than $CuF_2$).

Since the formation of lithium fluoride (LiF) intermixed with clusters or nanoparticles of metal(s) in such a way as to avoid oxidation of metal clusters/nanoparticles (with the formation of metal oxides) may be challenging, the present disclosure provides examples of suitable methods that minimize or eliminate the undesirable formation of metal oxides instead of the desired pure metal(s).

The present disclosure provides favorable compositions of the metal in the corresponding metal clusters or nanoparticles of various shapes or layers in the above-discussed composite materials. This improved metal composition allows for improved cathode properties, such as improved mechanical and electrochemical stability, reduced energy losses during cycling, and improved rate performance, to name a few.

The present disclosure also provides advantageous architectures of the composites comprising lithium fluoride (LiF) (or other halides, such as LiCl) intermixed with clusters or nanoparticles of metal(s) of various shapes or layers and further embedded into the skeleton material matrix (for example, into the skeleton matrix particles), which further improves stability, reduces volume changes during cycling, and improves other properties of the cathodes based on such composites (such as rate performance).

For many applications, it may be advantageous for the skeleton matrix material to be in the form of individual particles (powders). For significantly improved structural and chemical stability, the skeleton matrix for each composite particle may preferably be in the form of a single monolithic particle (a single-bodied particle). For many applications, it may be advantageous for the skeleton matrix material particles to be of substantially spherical shape (e.g., in order to enhance mechanical properties or the stability of individual particles). For many applications, it may be advantageous for the skeleton matrix material particles to be uniform in size (e.g., with a difference between a so-called "D90" parameter and a so-called "D10" parameter being less than a so-called "D50" or a median particle size; more preferably less than 50% of an average size; even more preferably less than 20% of an average size). In this case the particle architecture may be optimized for enhanced stability and sufficiently high rate, and the electrode-level ionic resistance may be minimized by forming straight channels for electrolyte ion transport within the electrode. As will be further described, it may also be advantageous for the skeleton matrix material to be electrically conductive (e.g., exhibit electrical conductivity above about 0.000001 S/m; preferably above 0.001 S/m; more preferably above 0.1 S/m; and even more preferably above around 10 S/m). For many applications, it may be advantageous for the electrode comprising the skeleton matrix material particles or composite particles (such as particles comprising a porous skeleton matrix material filled with lithium fluoride intermixed with clusters or nanoparticles of metal(s)) to comprise conductive additives (e.g., carbon black, carbon nanotubes, carbon fibers, graphite flakes, etc.) that are chemically bonded (or sintered) to the surface of such particles. In this case the fluoride-based composite particles may exhibit better stability during electrochemical cycling in cells due to significantly slower electrode degradation. It may further be advantageous for conductive additives bonded to neighboring composite particles to additionally form chemical bonds with each other.

The present disclosure also provides an improved architecture of such composites, where each composite particle comprises a shell at least partially encasing the active material (such as a lithium fluoride material intermixed with metal clusters or metal nanoparticles), the shell being substantially permeable to the Li ions stored and released by the active fluoride material and being substantially impermeable to electrolyte solvent molecules and (preferably) to ions of the metals in the above-discussed metal clusters/nanoparticles during cell operation. If the active material (such as a lithium fluoride material intermixed with metal clusters or metal nanoparticles) is embedded into a skeleton matrix material, the shell may at least partially encase the composite comprised of the skeleton matrix material with the embedded active material (such as a lithium fluoride material intermixed with metal clusters or metal nanoparticles). The presence of the protective shell(s) significantly reduces the undesirable side reactions of metal fluorides with the electrolyte and thus improves cell cycle stability and overall performance. Examples of a suitable structure of the Li-ion permeable protective shell(s), a suitable composition of the Li-ion permeable protective shell material, and suitable methods of shell fabrication are also provided.

The present disclosure also provides suitable methods for fabrication of the above-discussed composites.

As mentioned briefly above, instead of using transition metal fluorides, this disclosure provides an intermixed lithium fluoride (LiF)/metal matrix nanocomposite material. In one example, this material may be viewed as a metal fluoride cathode material in a fully lithiated (discharged) state. However, this material offers significantly more flexibility in the design and optimization of the cathode properties than simply a lithiated transition metal fluoride and thus allows for the formation of significantly better cathodes. In one example, this material may have an excess of LiF (which may be beneficial if some of the LiF is lost during subsequent processing) or an excess of metal nanoparticles (which may be beneficial for improvement of the rate capability of the cathode due to retaining electrically conductive material within an electrically insulative metal fluoride matrix and also due to the remaining metal serving as heterogeneous nucleation sites for the formation of metal clusters/nanoparticles during the conversion reaction). Another advantage of this material is its high chemical and thermal resistance. For example, if $CuF_2$ is heated in the presence of $H_2$, C, or other reducing agents at very moderate temperatures (sometimes as low as about 80 to about 200° C.), the $Cu^{2+}$ ions of $CuF_2$ may reduce to $Cu^0$ metal (note that since this occurs without the simultaneous formation of LiF, an electrochemical reaction back to $CuF_2$ is prevented from occurring if a battery is assembled with this material.). In contrast, when a mixed LiF/Cu matrix is heated at similar conditions, it will remain largely unaffected (because LiF is more stable than $CuF_2$ and because Cu metal is already in the reduced state). Therefore, the formation of protective outer shells (shells that would protect this material from undesirable interactions with the electrolyte) and/or electrically conductive shells (shells that would provide electrical connectivity between individual particles and the current collector) around the LiF/Cu composite matrix particles may be performed at elevated temperatures and in a reducing environment (e.g., by using a CVD process that may involve $H_2$ generation or by using a thermal decomposition of a precursor material, etc.) and thus be of significantly higher quality (better mechanical stability, better integrity, better uniformity, etc.). Furthermore, since this material already has Li in the structure, further expansion is prevented from taking place during cell operation, and thus, fracturing of the electrode, the composite particles, or the outer protective shells may be significantly reduced or minimized.

FIGS. 2A-2D illustrate selected examples of suitable architectures for LiF/M (where M is a metal or metal alloy) nanocomposite particles.

FIG. 2A illustrates a relatively plain example where an interpenetrating matrix of LiF 201 and M 202 produce a single particle. Because LiF is electrically isolative, it may be preferable that the furthest distance from the electrically conductive material of the composite to the majority (preferably at least 90%) of the Li atoms in the LiF volume does not exceed approximately 10 nanometers. To maximize the rate performance and capacity utilization of this composite material, it may be preferable that the majority of the clusters or nanoparticles of metal(s) are electrically connected. The use of another electrically conductive material (e.g., another metal, conductive carbon, conductive polymer, conductive oxide, etc.) within LiF/M nanocomposite particles may also be advantageous in terms of electrical conductivity, mechanical and electrochemical stability, and rate capability of such cathode materials. In some designs (e.g., when this other metal is added to the composite in order to enhance its electrical conductivity or mechanical stability), this other metal component may exhibit higher resistance to fluorination (so that this metal remains in a metallic state during electrochemical cycling, while the primary metal component changes from the metallic to metal fluoride states).

FIG. 2B illustrates a slightly different example, where the LiF 201 forms a porous particle, the pores of which are filled with the metal(s) M 202 to form a LiF/M nanocomposite. In some applications it may be advantageous for the LiF particle to be monolithic (single-bodied) for improved structural and chemical stability. Formation of such a porous LiF may involve the use of sacrificial templates (materials that are removed after LiF formation by decomposition, dissolution, or other mechanisms, thus producing pores within the LiF). The pores within the LiF 201 (at least partially filled with the M 202) may be closed or open. In the case of closed pores, the metal(s) M 202 is protected from undesirable interactions with electrolyte by the LiF 201. On the other hand, it is important to maintain electrical connectivity within such a composite. To achieve that goal, the distance between the neighboring individual conductive M 202 particles (or layers) in closed pores of the porous LiF 201 may be made sufficiently small to allow quantum mechanical tunneling of electrons from one neighboring particle to another or from these particle to another electrically conductive material (typically below around 3-6 nm). This typically translates into a small width of the pore walls in the porous LiF 201.

Alternatively, the pores within the porous LiF 201 may be interconnected. In this case, the conductive M 202 may form an interconnected network (as described above with reference to FIG. 2A). Alternatively, the conductive metal filler M 202 may form individual clusters or particles of various shapes that do not form a continuous interconnected body, but be electrically connected with another electrically conductive material shown by way of example as connectors 204 (e.g., another metal, conductive carbon, conductive polymer, conductive oxide, etc.), thus still forming an electrically connected network within a LiF/M nanocomposite.

FIG. 2C illustrates yet another slightly different example, where the metal(s) M 202 forms a porous (and preferably monolithic) particle, the pores of which are filled with the LiF 201 to form a LiF/M nanocomposite. Formation of such porous metal(s) may involve the use of sacrificial template materials (materials that are removed after M formation by decomposition, dissolution, or other mechanisms, thus producing pores within the M). The pores within the M 202 (at least partially filled with the LiF 201) may be closed or open. Closed pores may typically reduce Li transport within the LiF/M nanocomposite particle (particularly at lower temperatures) because Li diffusion within most metals is relatively slow. However, if the pore walls within a porous metal M 202 are kept sufficiently thin (e.g., below around 10-20 nm) or if the composition of the porous metal M 202 is tuned (e.g., by using mixed metals with a high Li diffusion coefficient at grain boundaries) to exhibit sufficiently high Li mobility, such an architecture may still provide sufficiently high rate performance to the metal fluoride electrode. In such particles, it may be advantageous to provide an excess of the M 202 atoms (versus the number of metal atoms required to balance Eq. 1) in order to maintain stability of such an architecture. In other words, some of the metal atoms in the porous M 202 may serve to preserve mechanical stability of the composite and enhance its conductivity rather than participating in the electrochemical reaction described by Eq. 1. The excess of metal atoms may typically range from around 0.1 at. % to around 60 at. %. A smaller excess increases energy density of the composite electrode. Above around 60 at. % may reduce both the specific and volumetric energy densities of the cells to undesirably low levels. Below around 0.1 at. % may be too low to provide stability to the composite particle. Open pores within the porous M 202 may be utilized to achieve faster Li transport within the LiF/M nanocomposite particle (e.g., through the surface or grain boundaries of the components of the composites).

The use of another electrically conductive material (e.g., another metal, conductive carbon, conductive polymer, conductive oxide, etc.) within various types of LiF/M nanocomposite particles may be advantageous for enhancing performance characteristics (e.g., stability, rate, etc.) of the cathodes.

In some applications it may be advantageous for the LiF 201 to contain dopants to enhance its electrical conductivity.

FIGS. 2D and 2E illustrate examples where LiF 201/M 202 nanocomposite-comprising battery electrode particles are further coated with a functional shell 203. The function of the shell 203 may be to prevent undesirable reactions between the electrolyte and M or between the electrolyte and LiF. The function of the shell 203 may be to improve electrical conductivity (since LiF is electrically insulative). The function of the shell 203 may be to improve the properties of the active material/electrolyte interface (or interphase)—e.g., by reducing charge transfer resistance or stability, or providing other suitable and useful functions.

FIGS. 3A-3E illustrate examples where a LiF 301/M 302 nanocomposite is further embedded into a skeleton matrix material 305 (forming an active material core) to further improve its performance and stability or to increase the particle dimensions (which makes the nanocomposite powder easier to handle and to cast into the electrode for batteries) without reducing the composite rate performance or stability. The skeleton matrix material 305 minimizes structural changes in the cathode during cycling, improves its mechanical stability, and prevents (or significantly restricts) irreversible growth of the metal cluster/nanoparticle size during battery operation. In addition, the skeleton matrix material stabilizes the contact with any polymer binders and any conductive additives used within the cathode. The skeleton matrix material 305 may be electrically conductive. In this case, the electrical conductivity of the composite particles will be further increased (and, as a result, the power performance of the cells may be enhanced). The skeleton matrix material 305 may be ionically conductive. In this case, ionic conductivity of the composite particles may be further increased (and, as a result, the power performance of the cells may be enhanced). The skeleton matrix material 305 of each composite particle may preferably be a single monolithic particle (as opposed to the agglomerate of individual skeleton matrix material building block particles mixed or milled together with active material) so that all or at least substantially all atoms of the skeleton matrix material particle are chemically bonded (for example via covalent, ionic, metallic, or mixed bonds). The skeleton matrix material of each composite particle may be viewed as a porous matrix particle, the pores of which are filled with the active LiF material 301 intermixed with the M 302 nanoclusters or metal nanoparticles.

This intermixing of the LiF 301 and the metal(s) or metal alloy(s) M 302 material may have architectures similar to those previously described in FIGS. 2A, 2B, and 2C (e.g., porous LiF 301 with pores filled with M 302, porous M 302 with pores filled with LiF 301, porous LiF 301 and porous M 302 interpenetrating each other, etc.). The pores in such composite skeleton matrix material particles may also be interconnected or closed, depending on the fabrication procedure and depending on the ionic conductivity of the skeleton matrix material 305 (open pores may be preferable if the skeleton matrix material 305 is not very ionically conductive or insufficiently ionically conductive). The average characteristic pore width (or pore diameter) in the skeleton matrix material 305 may preferably range from about 1 nm to about 500 nm (for higher rates, it may more preferably range from about 2 nm to about 30 nm). The average characteristic thickness of pore walls in the skeleton matrix material 305 may preferably range from about 0.1 nm to about 50 nm. Skeleton matrix material pore walls thinner than about 0.1 nm may be insufficiently conductive and/or insufficiently mechanically robust. Skeleton matrix material pore walls thicker than about 50 nm may undesirably increase the volume fraction of the skeleton matrix material 305 to a level where it undesirably reduces cathode volumetric and gravimetric capacities to below acceptable levels (for a given application). In some cases, it may be advantageous for the skeleton matrix material to have a distribution of the pore wall thickness, where some of the pore walls are thick (e.g., from about 1 nm to about 50 nm) and provide mechanical support, while other pore walls are thin (e.g., from about 0.1 nm to about 1 nm) and provide other functionalities (e.g., add electrical conductivity to the composite, prevent the growth of M 302 and LiF 301 clusters during cycling, etc.).

FIG. 3E illustrates examples where a LiF 301/M 302 nanocomposite-comprising battery electrode particle is further coated with a functional shell 303. FIG. 3C illustrates an example where a LiF 301/M 302 nanocomposite-comprising battery electrode particle further comprises an electrically conductive material shown by way of example as connectors 304.

The shape of the particles in FIGS. 2A-2E and 3A-3E may be near spherical, as in the illustrated examples, or be elongated, have a flat-shaped morphology, have a fiber-like shape, or have any other suitable shape for a given application. However, in some cases, the approximately spherical or approximately elliptical shape of the cathode particles may be advantageous for enhancing the rate performance of the electrodes. In order to further enhance rate performance of the electrodes comprising such particles, it may be advantageous for nearly all (e.g., over 90%) of the particles to be approximately the same in size (e.g., within +/−20% or even less, with the more uniform the better). Such a high size uniformity may allow formation of colloidal crystal-like structure within the electrodes and lead to the formation of aligned pores within densely packed spheres. This electrode architecture may particularly benefit particles comprising so-called conversion-type active materials (e.g., fluorides, as described above, as well as, e.g., $Li_2S$, S, Si, Sn, etc.) because these may typically require a larger fraction of a binder, may comprise smaller particles, may suffer from substantial (e.g., greater than 5%) volume changes and excessive electrolyte decomposition, all of which reduce ion transport within the electrode and thus reduce electrode rate performance.

In some designs, the metal clusters or metal nanoparticles M 202/M 302 of the above-discussed lithium fluoride-comprising composites may comprise more than one type of metal atoms to exhibit more favorable electrochemical behavior in cells (such as better rate performance, smaller hysteresis, better cycle stability, better low temperature performance, better high temperature performance, better stability, easier manufacturability, etc., to name a few). The origin of such performance improvements is believed to be related to the favorable bonding between individual metal atoms that (i) prevents the growth of metal clusters during the repeated conversion reactions during battery operation; (ii) minimizes the size of metal and LiF clusters in the composite; (iii) provides lower energy pathways for the conversion reaction; (iv) prevents leaching some of the metal ions (e.g., $Cu^{2+}$ ions) out of the composite particles; and (v) minimizes other side reactions; or may be related to other known or unknown phenomena. In some cases, the use of mixed metals in the formation of composites allows improved control of the resulting particle morphology and architecture. In some designs, the metal clusters or metal nanoparticles of different composition may be present in a single composite particle. In some designs, metal clusters or metal nanoparticles are composed of several metals to offer improved performance. In some designs, the bonding between at least some of the metal atoms is partially ionic (due to some difference in the electronegativity of different metal atoms). In some designs, the metals of the "mixed metal" clusters or nanoparticles exhibit the same crystal structure (e.g., all face centered cubic, FCC, or all base centered cubic, BCC) at room temperature at equilibrium conditions. In some designs, metal clusters or metal nanoparticles may comprise a solid solution of metals. In some designs, metal clusters or metal nanoparticles may comprise intermetallic compounds. In some designs, metal clusters or metal nanoparticles may exhibit a core-shell structure, where the composition of the metal cluster/nanoparticle changes from the center to the perimeter of such particles. In some designs, the average composition of the metal cluster/ nanoparticle may change from the center to the perimeter of the metal-LiF-skeleton matrix material composite particles.

In some designs, the metal clusters or metal nanoparticles of the M 202/302 may comprise Cu atoms. In some designs, the atomic fraction of Cu atoms in the clusters/nanoparticles may range from about 10 at. % to about 100 at. % (as a portion of the total metal atoms in the cluster/nanoparticle). In some designs, the metal clusters or metal nanoparticles may comprise Fe atoms. In some designs, the average atomic fraction of Fe may range from about 3 at. % to about 100 at. %. In some designs, the metal clusters or metal nanoparticles may comprise Ni atoms. In some designs, the average atomic fraction of Ni may range from about 0.05 at. % to about 100 at. %. In some designs, the metal clusters or metal nanoparticles may comprise Co atoms. In some designs, the average atomic fraction of Co may range from about 0.05 at. % to about 100 at. %. In some designs, the metal clusters or metal nanoparticles may comprise Ti atoms. In some designs, the average atomic fraction of Ti may range from about 0.01 at. % to about 21 at. %. In some designs, the metal clusters or metal nanoparticles may comprise Zn atoms. In some designs, the average atomic fraction of Zn may range from about 0.05 at. % to about 46 at. %. In some designs, the metal clusters or metal nanoparticles may comprise Bi atoms. In some designs, the average atomic fraction of Bi may range from about 0.01 at. % to about 100 at. %. In some designs, the metal clusters or metal nanoparticles may comprise Pb atoms. In some designs, the average atomic fraction of Pb may range from about 0.01 at. % to about 5 at. %. In some designs, the metal clusters or metal nanoparticles may comprise Sb atoms. In some designs, the average atomic fraction of Sb may range from about 0.01 at. % to about 35 at. %. In some designs, the metal clusters or metal nanoparticles may comprise Sn atoms. In some designs, the average atomic fraction of Sn may range from about 0.05 at. % to about 26 at. %. In some designs, the metal clusters or metal nanoparticles may comprise Cd atoms. In some designs, the average atomic fraction of Cd may range from about 0.01 at. % to about 50 at. %. In some designs, the metal clusters or metal nanoparticles may comprise Cr atoms. In some designs, the average atomic fraction of Cr may range from about 0.001 at. % to about 2 at. %. In some designs, the metal clusters or metal nanoparticles may comprise Zr atoms. In some designs, the average atomic fraction of Zr may range from about 0.1 at. % to about 28 at. %. In some designs, the metal clusters or metal nanoparticles may comprise Nb atoms. In some designs, the average atomic fraction of Nb may range from about 0.1 at. % to about 40 at. %. In some designs, the metal clusters or metal nanoparticles may comprise Mo atoms. In some designs, the average atomic fraction of Mo may range from about 0.01 at. % to about 20 at. %. In some designs, the metal clusters or metal nanoparticles may comprise Hf atoms. In some designs, the average atomic fraction of Hf may range from about 0.01 at. % to about 41 at. %. In some designs, the metal clusters or metal nanoparticles may comprise Ta atoms. In some designs, the average atomic fraction of Ta may range from about 0.01 at. % to about 35 at. %. In some designs, the metal clusters or metal nanoparticles may comprise Si atoms. In some designs, the average atomic fraction of Si may range from about 0.01 at. % to about 1 at. %. Larger quantities of Si may lead to the formation of gaseous $SiF_4$, which may leak out during material processing or cell operation. In some designs, the metal clusters or metal nanoparticles may comprise La atoms. In some designs, the average atomic fraction of La may range from about 0.01 at. % to about 20 at. %. In some designs, the metal clusters or metal nanoparticles may comprise Ce atoms. In some designs, the average atomic fraction of Ce may range from about 0.01 at. % to about 20 at. %.

In some designs, the metal clusters, metal nanoparticles, or porous metal particles (such as the M 202 in FIGS. 2A-2E or the M 302 in FIGS. 3A-3E) may be produced by vapor deposition routes, such as chemical vapor deposition (CVD) or atomic layer deposition (ALD) processes or, in some cases (for example, when a high metal vapor pressure may be achieved and utilized) by condensation of metal vapors. In some designs, the metal (or metal alloy) clusters or nanoparticles may be produced from various metal precursors (e.g., metal-organic compounds or metal salts), which are decomposed (e.g., upon heating) or reduced.

When the skeleton matrix material 305 is utilized for the cathode composite construction, the metal clusters/nanoparticles may be infiltrated into the pores of the skeleton matrix material 305 or deposited onto the surface of the skeleton matrix material 305 (such as skeleton matrix material particles). The infiltration temperature may be sufficiently low to prevent excessive growth of metal particles (their minimum characteristic dimensions may preferably stay within 50 nm, or more preferably within 5 nm). Since it may be important to prevent formation of oxide on the metal surface, the concentration of oxygen containing reactive species (such as $O_2$, $CO_2$, $H_2O$, and others) in the deposition chamber may preferably be kept to a minimum (so that the total amount of O atoms entering the chamber during the deposition may preferably be significantly below the total number of metal atoms deposited, preferably 10 at. % or below).

In some designs, the metal clusters or metal nanoparticles may be produced or deposited by electroless deposition or electrodeposition on skeleton matrix material substrates (e.g., into the pores of porous skeleton matrix particles).

In some designs, the metal clusters, metal nanoparticles, or porous metal(s) may also be produced via a wet synthesis route, either by homogeneous nucleation in the bulk of a solution or by heterogeneous nucleation on the surface of the skeleton matrix material.

In some designs, the metal clusters or metal nanoparticles (e.g., the M 202 in FIGS. 2A-2E or the M 302 in FIGS. 3A-3E) may be interconnected. In some designs, these interconnected metal nanoparticles may be in the form of a metal foam or a porous metal powder (e.g., as shown in FIG. 2C). The thickness of the foam walls (or pore walls in porous metals) may be in the range from about 1 nm to about 50 nm, where smaller wall thickness may be preferable for achieving higher electrochemical rate performance in the intermixed LiF-metal nanocomposite-based cathodes. In some designs, metal foam or a porous metal powder may comprise skeleton material.

In some designs, the LiF clusters, LiF layers, LiF nanoparticles, or LiF porous particles (the LiF 201 of FIGS. 2A-2E and the LiF 301 of FIGS. 3A-3E) may be produced by using vapor deposition routes, such as chemical vapor deposition (CVD) or atomic layer deposition (ALD) processes. In some designs, the LiF may be deposited from the solution either in the course of a chemical reaction or by solvent evaporation from the LiF solution. In some designs, a post-deposition annealing may be utilized (for example, to remove solvent residues or to improve bonding, etc.).

When a skeleton matrix material is utilized for the cathode composite construction (e.g., as in FIGS. 3A-3E), LiF may be infiltrated into the pores or deposited onto the surface of the skeleton matrix material before or after the metal infiltration. When a porous metal is used (e.g., as in FIG. 2C), LiF may be infiltrated into a porous metal powder to form intermixed LiF-metal nanocomposite(s). In some designs, in order to improve adhesion between LiF and M (or in order to increase the interfacial surface area) the M cluster/nanoparticle surface may be slightly oxidized to produce M-O or M-H (M=metal or metal alloy/mix; H=halide, such as Cl, F, I, or Br) bonds.

As an alternative to the subsequent formation or deposition of metal (M) and LiF clusters/nanoparticles/porous particles, metal fluoride ($MF_x$) (nano)particles may be first formed (or deposited or infiltrated into a skeleton matrix material) and then converted into the LiF/M nanocomposite by using one of the chemical lithiation procedures (preferably in an anhydrous environment or other environments free from those solvents that may induce undesirable interactions either with LiF or with M). These chemical lithiation processes may reduce a metal (M) from the $MF_x$ into its metallic state and simultaneously form LiF.

Figure 4A:
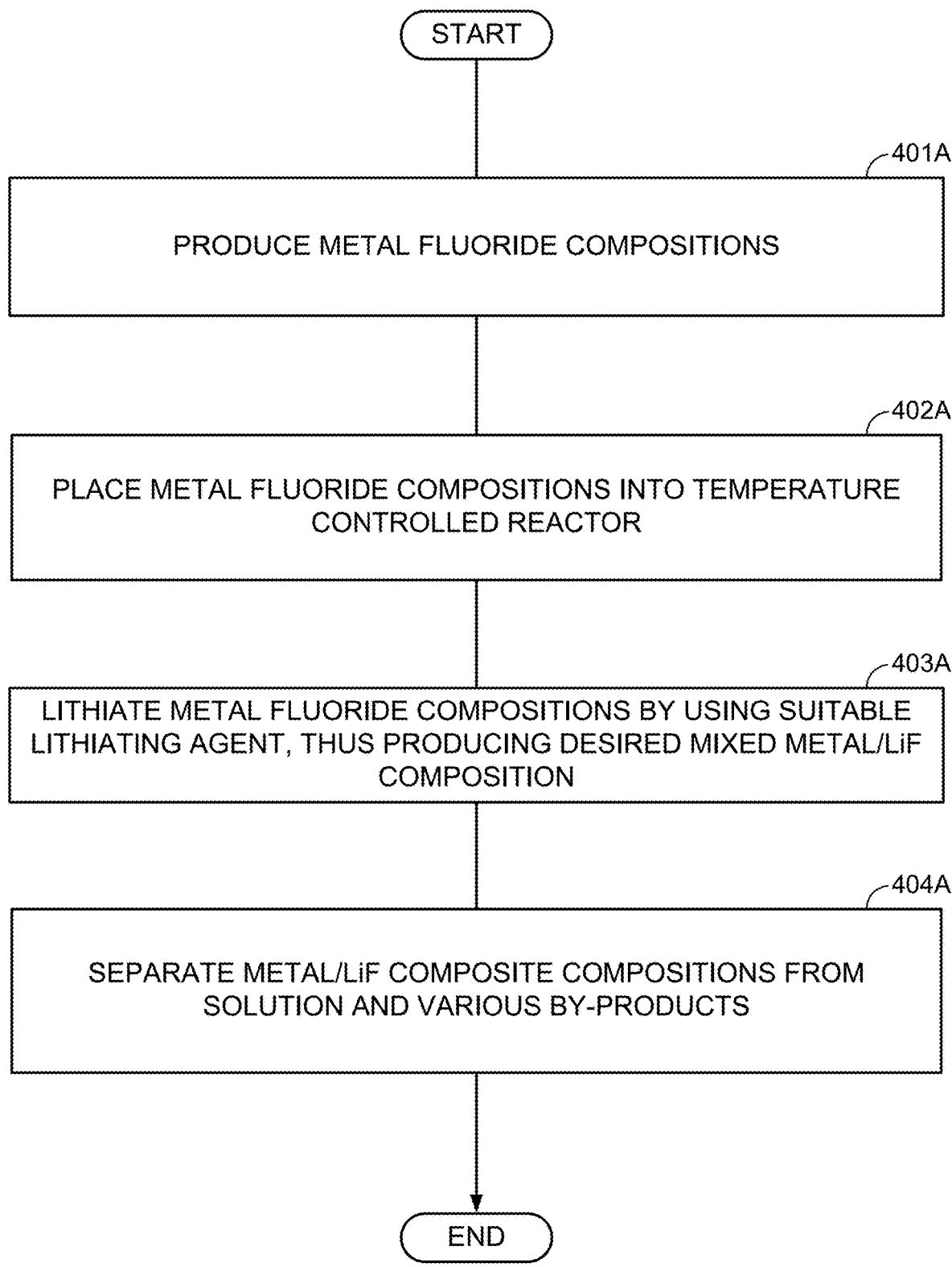
FIGS. 4A-4C, 5A-5C, and 6A-6B illustrate examples of methods involved in the fabricating of M/LiF-comprising composite electrodes.
Figure 4B:
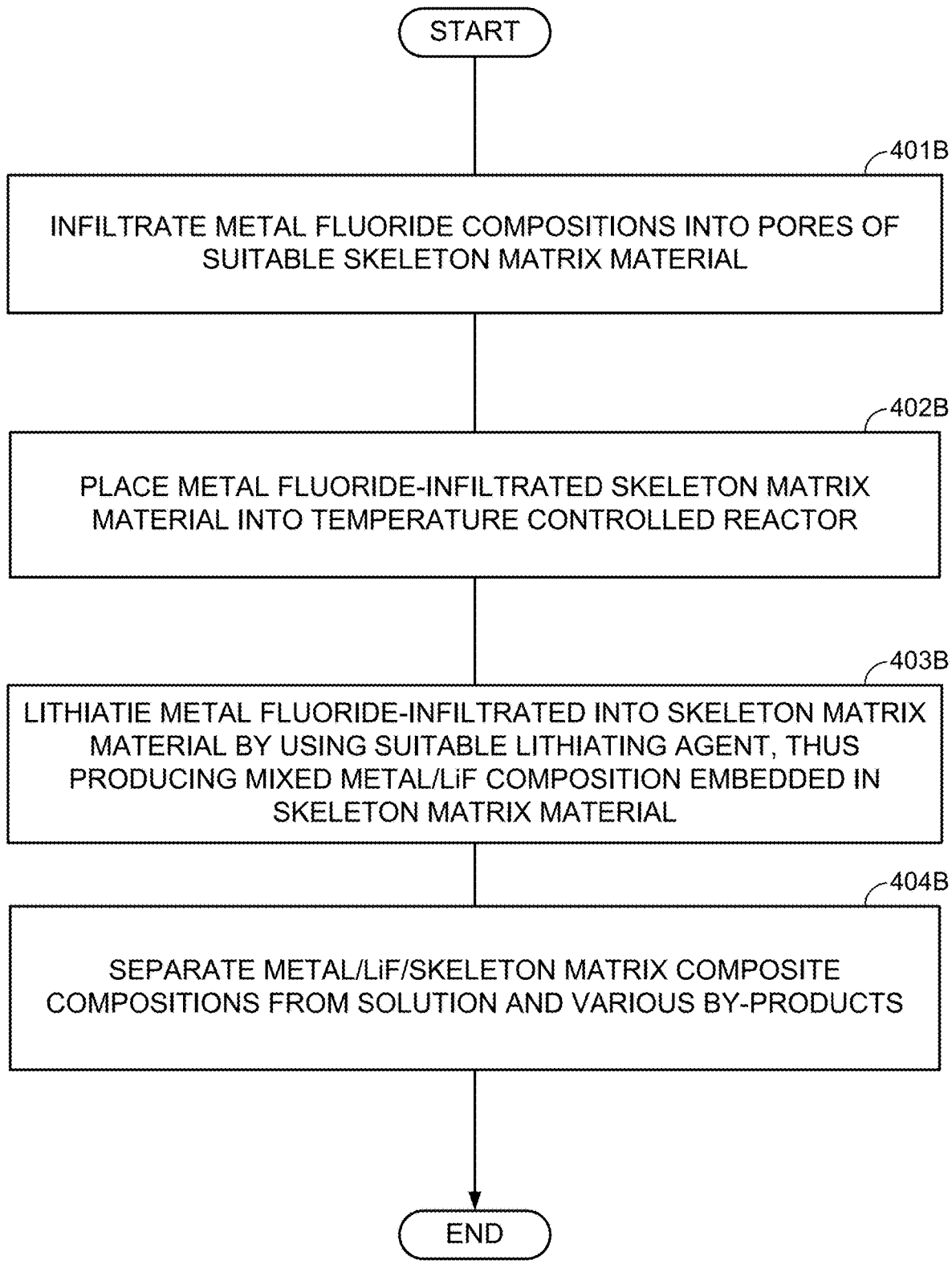
Figure 4C:
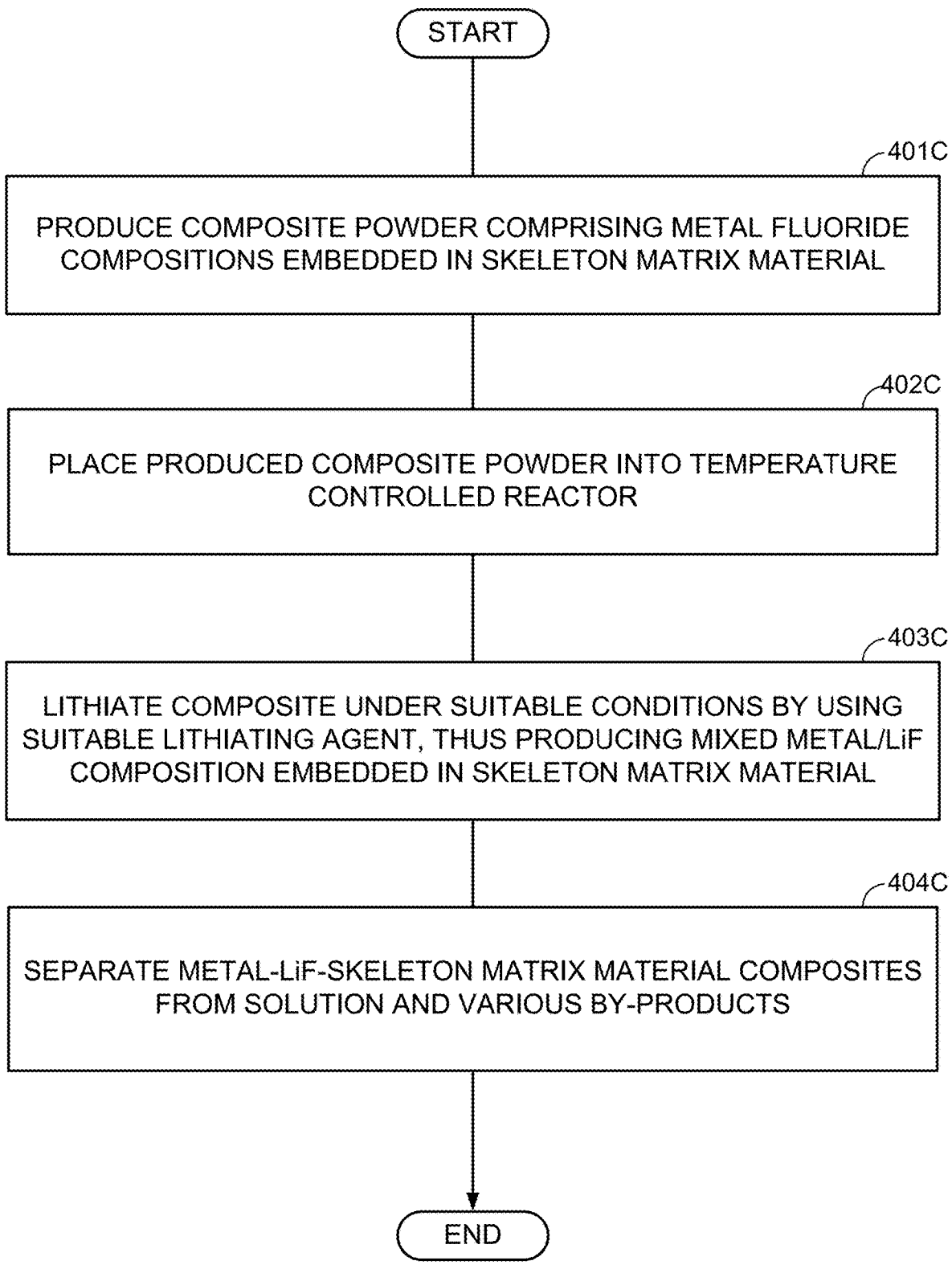

FIGS. 4A-4C illustrate examples of such formation processes. According to FIG. 4A, particles comprising desired metal fluoride compositions are first produced (block 401A). The size of such $MF_x$-comprising particles may typically range from about 1 nm to about 50 microns (in some designs, from about 50 nm to about 10 microns). In some designs, such particles may comprise from around 25 wt. % to around 100 wt. % metal fluoride(s). The rest may be (i) electrochemically inactive material, (ii) electrochemically active material, (iii) a precursor for excess LiF or excess M (if desired), or (iv) another useful material (e.g., a dopant, a surfactant, a sacrificial template material, or a precursor for the skeleton matrix material). It will be understood that "electrochemically active material" generally refers to a material capable of electrochemically accepting and releasing Li or other metal ions in excess of around 50 mA/g (Li capacity). Higher content of metal fluoride(s) may be preferable to achieve higher capacity in the cathode.

Subsequently, the $MF_x$ compositions may be placed in a temperature-controlled environment of the reactor (block 402A). Controlling temperature may be useful because lithiation temperature affects the size and morphology of structural features in the obtained M/LiF composites. At some temperatures (and compositions), M and LiF may form interpenetrating networks during lithiation of $MF_x$ particles. At other temperatures (and compositions), one may form porous M with LiF filling its pores during lithiation of $MF_x$. At yet other temperatures (and compositions), one may form porous LiF with M filling its pores. In some conditions, the obtained M/LiF composite particles largely retain the initial shape of the $MF_x$ particles. Such a situation may be preferable in many cases (e.g., when control of the composite morphology is important). At too high temperatures of the lithiation reactions, the size of M clusters or LiF clusters may be undesirably large and morphology of the M/LiF composite may deviate significantly from the morphology and size of the initial $MF_x$ particle. Unfortunately, chemical lithiation may be a highly exothermic process, where heat is released upon the chemical lithiation reaction. If such a reaction proceeds too fast and the heat extraction from the reactor is too slow, the control of the reaction temperature may be lost and the desired M/LiF composite morphology may not be obtained. The third step may involve lithiation of the $MF_x$ compositions (block 403A). Excess of metal (M) may be introduced into the M/LiF composite by, for example, post-deposition (e.g., by CVD, ALD, or wet chemistry routes—such as precipitation from the solution with subsequent reduction). Alternatively, a metal precursor may be added to the $MF_x$ particles prior to chemical lithiation. In this case the lithiation procedure may simultaneously reduce the metal precursor to form an additional metal component of the composite. Excess LiF may be introduced into the M/LiF composite by, for example, post-deposition (e.g., by CVD, ALD, or wet chemistry routes). Alternatively, fluorinating a composite matrix material may provide extra fluorine needed for the additional LiF formation during the chemical lithiation. By-products of the chemical reactions may be removed after synthesis.

In some designs, lithiation (block 403A of FIG. 4A) may proceed in a gaseous environment, where lithiation or reducing agents are delivered as vapor or gas molecules. The advantage of this approach is its high precision and control, but there may be disadvantages in terms of high cost, slow rates, and limited (often expensive) chemistries of the suitable lithiation/reducing agents available. In other designs, lithiation (block 403A of FIG. 4A) may proceed in a solid phase (by mixing the powders). Disadvantages of this approach include challenges associated with controlling uniformity of the reaction rates, local temperature, and, as a result, challenges controlling morphology of the resulting composites. In addition, the produced lithiated composite may often become too reactive to be handled safely. In yet other designs, the lithiation process (block 403A of FIG. 4A) takes place in solutions. The advantage of this approach (e.g., over lithiation by mixing powders in a dry state) is a more precise control over the reaction rate (e.g., controlled by the choice of the lithiating or reducing agents, their concentration, and by the temperature of the reactor since liquids have higher conductivities than gases). The use of some lithiating or reducing agents provides a more controlled lithiation and thus may be advantageous. Suitable examples of lithiating/reducing agents may include, but are not limited to the following: (i) lithium alkylborohydrides (including lithium triethylborohydride), (ii) alkyllithium reagents (including tri-sec-butylborohydride, n-butyllithium, sec-butyllithium, and tert-butyllithium), (iii) alkyllithium magnesates (including tri-n-butyllithium magnesate and lithium dibutyl(isopropyl)magnesate), (iv) radical anions of polycyclic aromatic hydrocarbons (including lithium naphthalene radical anion and lithium anthracene radical anion), (v) lithium ketone radical anions (including lithium benzophenone ketyl), (vi) lithium aluminum hydride, and (vii) lithium borohydride. Any of these lithiating/reducing agents may be solutions in hydrocarbon or ethereal solvents or mixtures thereof. In some designs, chemical lithiation of $MF_x$ may also be conducted using separate lithiation and reducing agents, where a reducing agent transforms metal ions $M^{x+}$ to a metallic state $M^0$ and another lithiation agent provides $Li^+$ cations that combine with anions to form LiF. Such an approach may also be advantageous as it adds a new degree of freedom to control the rate and heat release during the lithiation, and, in addition, may allow overall process cost reduction. Lithiation agents include any $Li^+$-containing salts (for example, lithium carbonate, lithium hexafluorophosphate, lithium nitrate, lithium phosphate, lithium sulfate, lithium tetrafluoroborate, lithium trifluoromethanesulfonate, lithium bis(trifluoromethyl)sulfonamide) and reducing agents may be any compound in its reduced form with a reduction potential below that of $M^{x+}/M$ (for example, any reducing/lithating agent listed above with a Group 1 or Group 2 metal cation in place of lithium, hydrazine, bis(cyclopentadienyl)cobalt (II), bis (pentamethylcyclopentadienyl)cobalt(II), $SmX_2$ (X=F, Cl, Br, I), Ni(0) compounds, tin alkyl hydrides). The obtained composite particles (comprising metal and LiF components) may then be separated from the solution (block 404A) (e.g., by filtering, washing, and drying).

Many lithiation/reducing agents are reactive to air and moisture and may need to be handled under a dry, inert atmosphere. Ideally, lithiating/reducing agents should produce LiF and $MF_x$ without side reactions and with reaction byproducts that are easily removable. Byproducts may be removed by extraction with organic solvents or evaporation/sublimation at reduced pressures or elevated temperatures. Alkyllithium reagents produce short-chain hydrocarbon byproducts that may be either extracted with organic solvents or removed by evaporation under reduced pressure or elevated temperature. A drawback of alkyllithium reagents is that they may produce alkylate metal salts (e.g., producing $M(alkyl)_x$), which is an undesired reaction in this case. The byproducts of organic radical anions (including ketyl radical anions or polycyclic aromatic hydrocarbon radical anions) may be uncharged organic small molecules that may be extracted with organic solvents or removed under reduced pressure or elevated temperature by evaporation or sublimation. The byproducts of alkyllithium magnesates, alkyl magnesium compounds, and hydrocarbons may also be easily removable by extraction in organic solvents or be removed by evaporation (e.g., under reduced pressure or elevated temperatures). Lithium trialkylborohydrides produce hydrogen gas and trialkylboranes, which may be easily removed by evaporation, but because trialkylboranes are pyrophoric this reagent may be less desirable for safety and ease of handling.

Reactions with chemical reducing agents may be conducted in organic solvents, specifically including ethereal solvents such as tetrahydrofuran, dimethoxyethane, diethylether, or dioxolane or hydrocarbon solvents such as C5-C9 alkyl chains. Reactions may be conducted under inert atmosphere to prevent oxidation by $O_2$ or oxidation or hydration by water. The temperature of lithiation reactions may typically range from about −78° C. to about 600° C. (too low temperature restricts reaction kinetics too much, while too high temperature makes it less controllable). Pressure of the reaction may range from about 0.05 atm to about 50 atm (near-atmospheric pressure may typically be suitable). Concentration of the soluble reducing agents may range from about 0.001 M to about 10 M (or more, in some cases) in the reaction solvent. Molar ratios of lithium cations $Li^+$ relative to metal cations $M^{n+}$ may range from about 0.5n to about 100n. The byproducts and solvents from reaction may be removed by filtration, centrifugation, evaporation, sublimation, carbonization, a combination thereof, or other methods.

Some of the above-described lithiation methods may be useful for lithiating other conversion-type electrode materials (e.g., S, Si, Sn, etc.) for use in rechargeable Li and Li-ion batteries.

In some designs, it may be advantageous to coat the lithiated particles by a protective surface layer (e.g., carbon or hyrdocarbons) in order to enhance their stability prior to conducting subsequent material processing steps (e.g., formation of shells around the composite particles or formation of electrodes from the composites, etc.). In some designs, such a protective coating may be deposited by expositing the lithiated composite (e.g., M-LiF or M-LiF-skeleton matrix material) into a stream of a hydrocarbon gas (e.g., in a temperature range from about room temperature to about 700° C.). In some designs, it may be advantageous not to expose the lithiated particles (either coated or not coated by a protective surface layer) to air, $O_2$, moisture, or other harmful environments in order to prevent their undesirable degradation (e.g., oxidation of metal M components of the composite) prior to conducting subsequent material processing steps (e.g., formation of shells around the composite particles or formation of electrodes from the composites, etc.).

FIG. 4B illustrates an example of a similar formation process, except that $MF_x$ compositions are first infiltrated into the porous skeleton matrix material (e.g., porous monolithic skeleton matrix material) (block 401B), followed by optionally placing the $MF_x$-skeleton matrix composite materials into a temperature controlled reactor (block 402B), conducting chemical lithiation (block 403B), and separating the obtained skeleton matrix/M/LiF composites from the by-products (block 404B).

In order to introduce more than one type of metal atom into the M nanoparticles/nanoclusters, several (more than one) different metal fluorides (e.g., $M1F_{x1}$, $M2F_{x2}$, $M3F_{x3}$, $M4F_{x4}$, their various mixture(s) or solid solution, etc.) may be used for the nanocomposite formation (may be introduced simultaneously or one after another, etc.). Advantages of this approach may include the decrease in an undesirably high reactivity and undesirable diffusion and growth of the M nanoparticles/nanoclusters during subsequent processing steps. Another advantage is the superior electrochemical performance of the composites comprising different metal atoms as cathodes in battery cells.

FIG. 4C illustrates an example of a similar but more general formation process, where suitable $MF_x$-skeleton matrix composite materials are produced (block 401C), placed into a temperature controlled reactor (block 402C) and chemically (or, in some designs, electrochemically) lithiated (block 403C), and separated from the by-products (block 404C).

In many cases, controlled formation of the metal fluoride $MF_x$ particles of the desirable composition, shape, size, and morphology can be challenging. Furthermore, infiltration of certain metal fluoride compositions into the pores of the skeleton matrix material may be even more challenging.

Figure 5A:
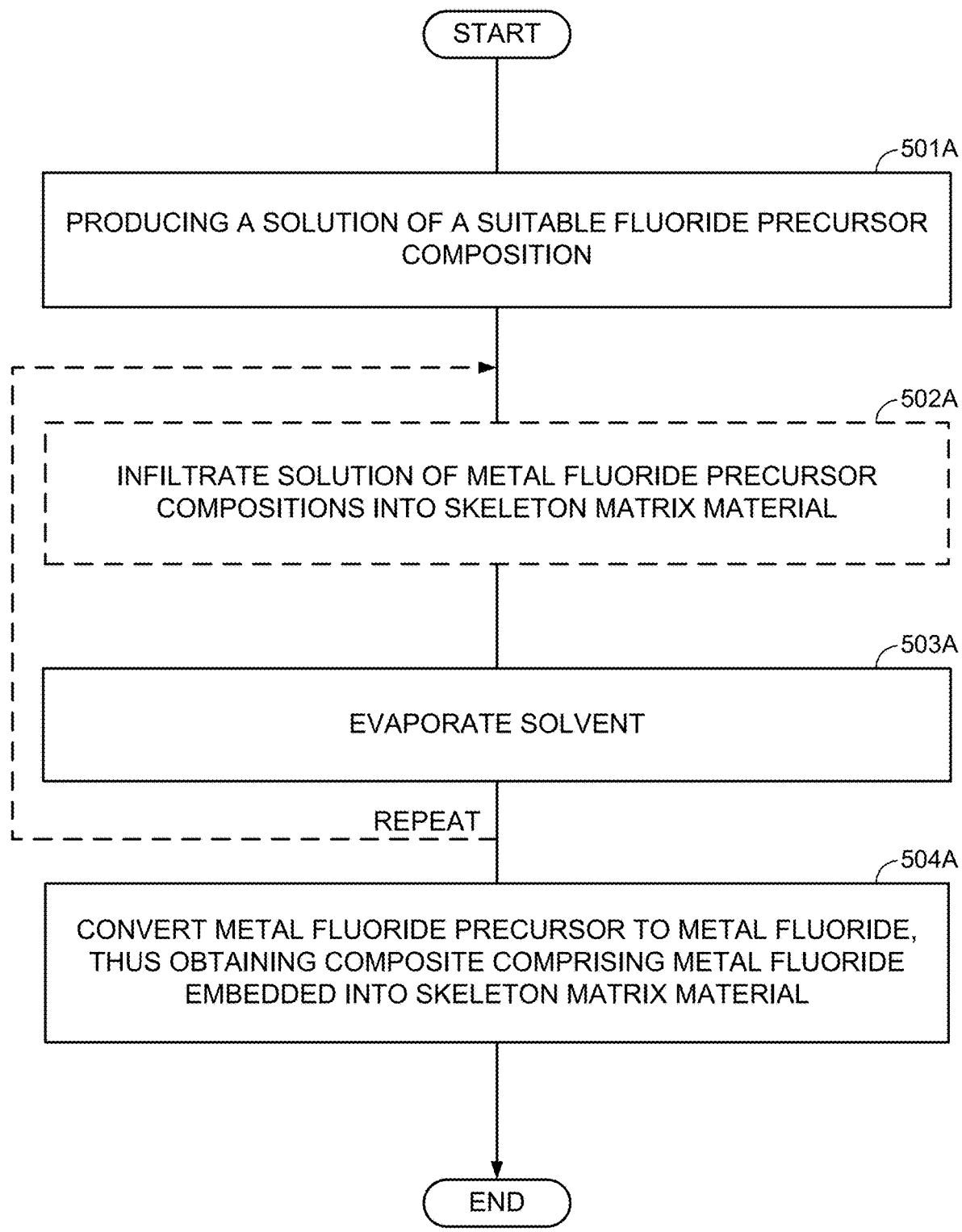

FIG. 5A shows an example of a suitable method for metal fluoride $MF_x$ infiltration into the pores of a skeleton matrix material or on the surface of the skeleton matrix material, where $MF_x$ formation involves the use of a soluble fluoride precursor. Such a method may include the following procedures: (i) preparation of a solution of a fluoride precursor (block 501A); (ii) (optionally) infiltrating such a solution into the skeleton matrix material pores or deposition onto the skeleton matrix material surface (optional block 502A); (iii) subsequent solvent evaporation (block 503A) (steps ii and iii may be repeated multiple times to achieve high fluoride loadings); and (iv) thermal annealing (block 504A) to decompose a fluoride precursor into a fluoride and a volatile species, which can be removed.

As an illustrative example, an aqueous solution of a salt of a fluorosilicic acid (e.g., $FeSiF_6.H_2O$) may be impregnated into skeleton matrix material pores, dried, and the produced salt may be transformed into a metal fluoride (e.g., an iron fluoride $FeF_2$) by annealing (for examples, in an inert argon (Ar) gas). The annealing process decomposes $FeSiF_6.H_2O$ into $FeF_2$ (more generally $FeF_x$), water vapors, and volatile $SiF_4$ (the $SiF_4$ boiling point=86° C.), with volatile compounds being removed.

Figure 5B:
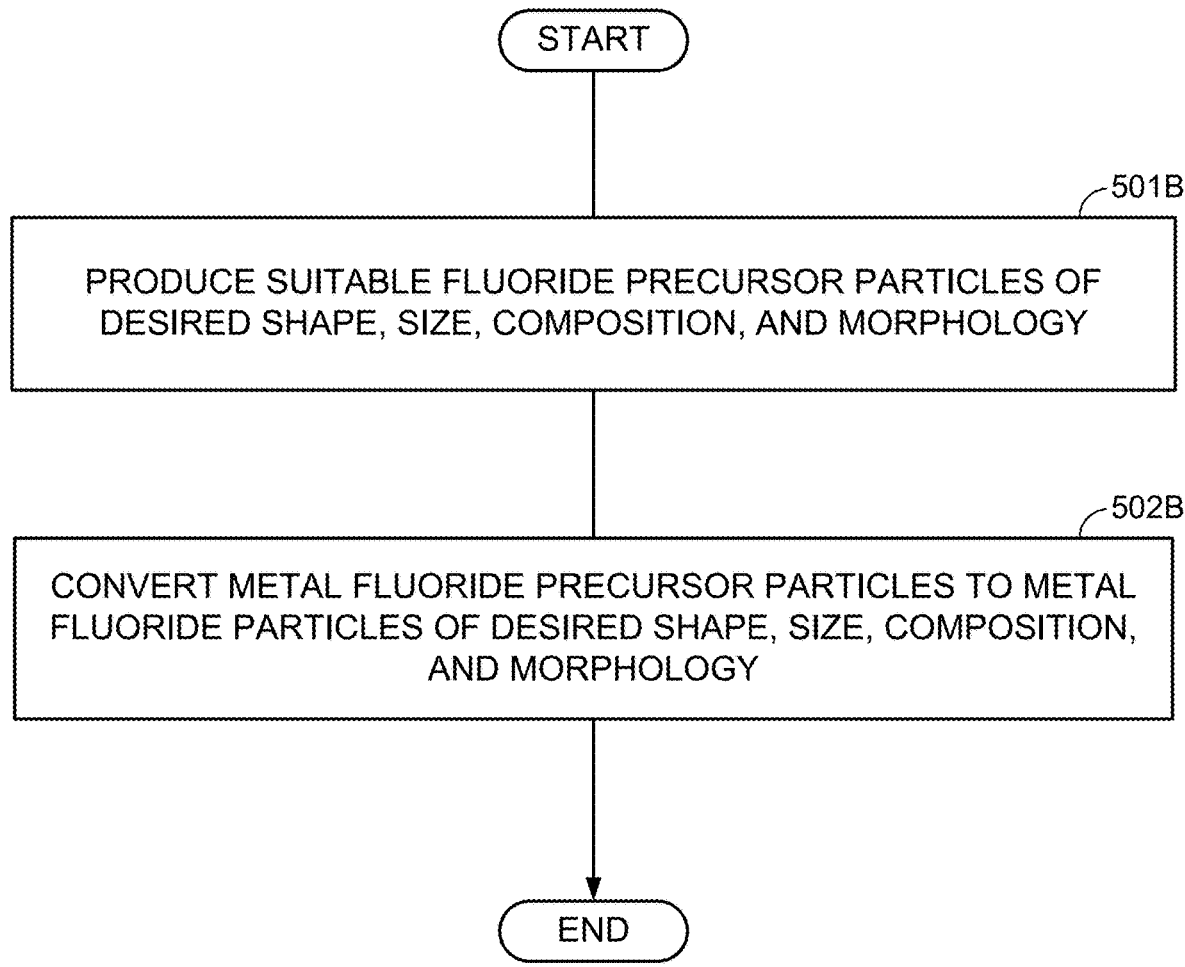

FIG. 5B shows a similar method that may be utilized for the formation of metal fluoride $MF_x$ particles of the desirable composition, shape, size, and morphology. In this case, easier-to-control fluoride precursor particles of the desired composition, shape, size, and morphology are first produced (block 501B) and then either annealed or reacted with other species to be converted to $MF_x$ particles (block 502B) and by-products, which may be removed from the system (preferably in a gaseous form). Synthesis conditions (e.g., temperature, pressure, concentration of the reactive species, etc.) may be controlled to preserve the overall shape of the particles during these transformations.

Figure 5C:
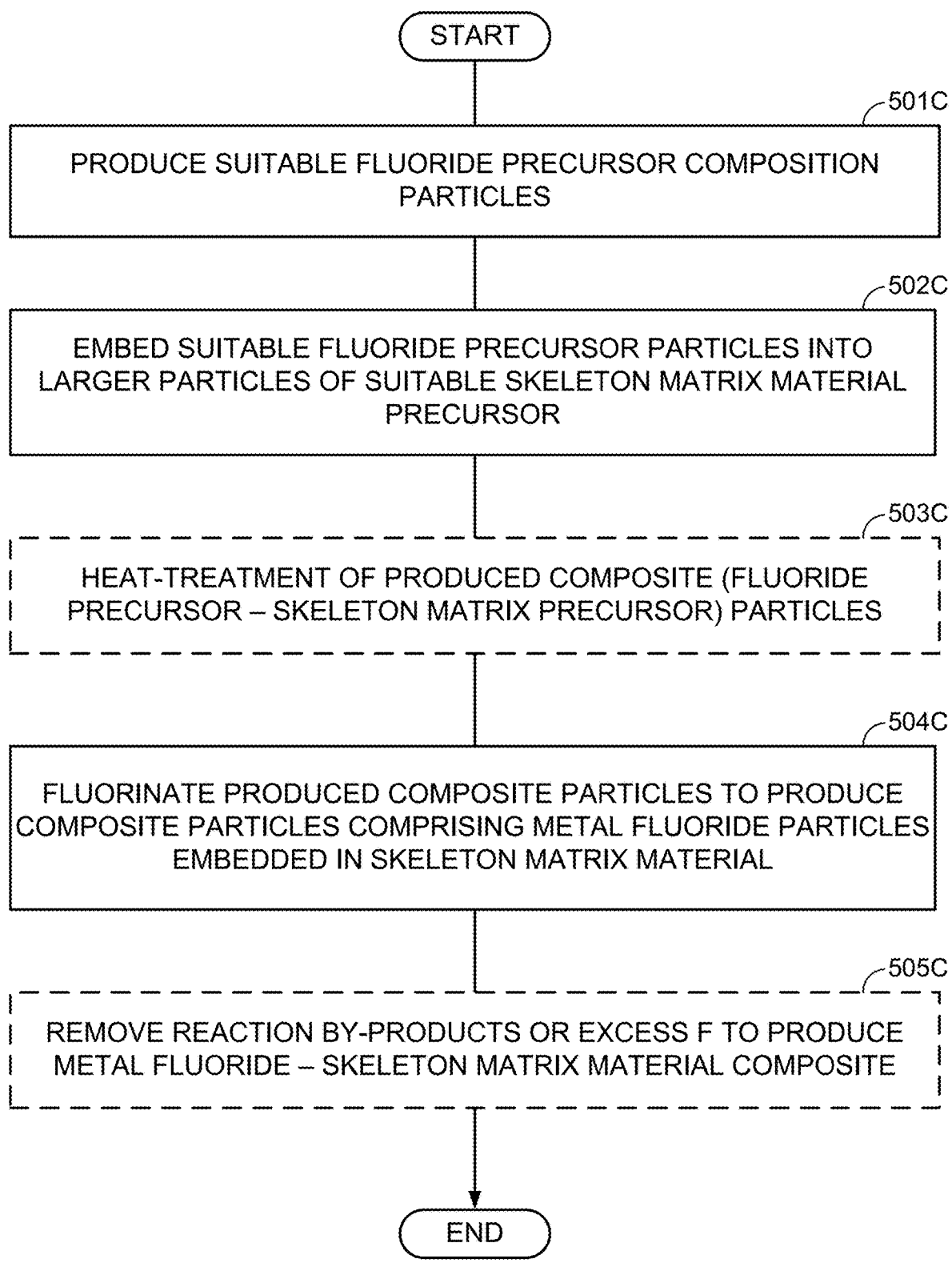

FIG. 5C shows another example method that may be utilized for the formation of metal fluoride/skeleton matrix composite particles. In this case, fluoride precursor particles of the desired composition, shape, size, and morphology are first produced (block 501C) and embedded into the particles of the precursor of the skeleton matrix material (block 502C). A broad range of the precursors for both the fluorides and precursor materials may be utilized (as discussed separately herein). As specific examples, metal particles (e.g., Cu, Fe, etc. (nano)particles) or metal salt particles (e.g., $CuCl_2$, $FeCl_2$, etc. (nano)particles) may be used as fluoride precursor particles. A precursor for a skeleton matrix material may be a carbonizable organic material (e.g., a polymer) or an organometallic material or another suitable material. An (optional) heat-treatment of the composite (optional block 503C) (e.g., in an inert environment) may be used to modify or convert metal fluoride or skeleton matrix material into more suitable material composition(s) (e.g., more conductive, more rigid, less reactive, etc.). The next step involves fluorination reaction (block 504C), followed by an (optional) removal of the reaction by-products or excess F (optional block 505C) (e.g., if excessive fluorination of the skeleton matrix material is undesirable), such as by heating in an inert environment. Synthesis conditions (e.g., temperature, pressure, concentration of the reactive species, etc.) in each step may be controlled to achieve the desired morphology of the composite particles.

In one example embodiment of such an approach, metal or metal alloy (nano)particles (e.g., Cu, Cu—Fe, Cu—Ni, Cu—Fe—Ni, or other types of suitable metal particles, preferably with over 10 wt. % Cu) are synthesized and coated by a polymer material (or other suitable skeleton matrix material, such as carbon, including either porous or dense carbon), producing metal-polymer (or metal-carbon) composite particles. In some designs, such particles may be agglomerated so that multiple (nano)particles are embedded into a polymer material. In some designs, multiple individual metal particles may be embedded into a polymer material. In some designs, metal particles (e.g., agglomerated particles) of one metal composition may be at least partially coated with another metal composition (in some designs, another metal composition may be more resistive to fluorination reaction and thus may remain conductive during electrochemical cycling; for example, coating at least part of the surface of Cu or Cu—Fe alloy particles with Ni, which is more resistive to fluorination and has a higher ignition temperature in fluorine than Cu and Fe). In some designs, such a metal coating process (e.g., reduction of metal salts) induces agglomeration of metal (nano)particles. The produced metal-polymer (or metal-carbon) composite particles may be heat-treated (e.g., to induce sintering of nanoparticles or to carbonize a polymer) and may be additionally ball-milled (e.g., to separate individual composite particles). The produced powder may be fluorinated. In some designs, a part of the metal composition (e.g., metal component that is more resistant to fluorination) may at least partially remain in metallic (electrically conductive) state. The next step may involve an optional removal of the reaction by-products or excess F (e.g., if excessive fluorination of the skeleton matrix material is undesirable), such as by heating in an inert environment. Synthesis conditions (e.g., temperature, pressure, concentration of the reactive species, etc.) in each step may be controlled to achieve the desired morphology of the composite particles. In some designs, the produced metal fluoride-skeleton matrix material composite may be additionally coated with Li-ion permeable shells (e.g., comprising carbon) that may serve to protect the MFx from undesirable interactions with environment during subsequent processing steps or during electrochemical cycling.

In the case of relatively volatile metal fluorides (e.g., $SbF_5$, $SbF_3$, $BiF_5$, $SnF_2$, and others), skeleton matrix material filling with the active material may be performed by capillary condensation of the fluoride vapor. Because of capillary action, vapor is preferentially condensed into skeleton matrix material capillaries, starting from the smallest pores, which exhibit the strongest interactions with the vapors.

Formation, infiltration or deposition of some of the $MF_x$ materials (particularly in HF-free and $F_2$-free environments) may sometimes be challenging. For example, $CuF_2$ is difficult to handle due to its reactivity and the tendency of the material to capture moisture ($CuF_2$ is very hygroscopic) and form CuO. Processing at elevated temperatures of composite materials containing hydrated $CuF_2$ may produce Cu(OH)F and/or copper oxide and release hydrofluoric acid vapors.

Several suitable methods for nanostructured $CuF_2$ processing (formation/deposition) are disclosed below.

As an example, hydrated $CuF_2$ (such as $CuF_2*2H_2O$) (a light blue-colored powder) is first dissolved in a suitable solvent (such as 2,2'-Bipyridyl, N,N,N',N'',N''-pentamethyldiethylenetriamine or Tris[2-(dimethylamino)ethyl]amine or pyridine, or other suitable solvent) generally producing a blue-colored solution. If a $CuF_2$/skeleton matrix nanocomposite material is desired, this solution may be infiltrated into the skeleton matrix material pores. A vacuum may be applied to help draw the liquid into the small (e.g., C) pores and evaporate the solvent. The process may be repeated additional times to increase mass loading of $CuF_2$. Since the deposited $CuF_2$ may still be hydrated, the $CuF_2$ may be dehydrated. One method for dehydrating hydrated $CuF_2$ may involve heating under an inert gas (such as Ar or He) stream or under vacuum at temperatures ranging from about 150 to about 500° C. Another method may involve dispersing hydrated $CuF_2$ in a solvent having a high (above about 150° C.) evaporation point (e.g., ionic liquids) and heat-treating the suspension under an inert gas stream or under vacuum. The exact temperature range of the suitable annealing/heat-treatment conditions depends on the chemistry of the skeleton matrix material and the size of the $CuF_2$ particles. For example, if the skeleton matrix material is made of a reducing agent, such as conductive carbon, too high of a temperature (e.g., above around 400° C.) may induce reduction of the material to Cu metal. Too low of a temperature may be insufficient to drive all $H_2O$ (or other solvent strongly bound to $CuF_2$) away. To assist in $CuF_2$ formation (e.g., to avoid formation of Cu(OH)F), annealing (heating) may also instead be performed in the presence of $F_2$, HF, or its precursors (such as $NH_4F$).

As another example, anhydrous $CuF_2$ may be first dissolved in a suitable solvent (such as anhydrous 2,2'-Bipyridyl, N,N,N',N'',N''-pentamethyldiethylenetriamine or anhydrous Tris[2-(dimethylamino)ethyl]amine or anhydrous pyridine, or other suitable anhydrous solvent), generally producing a blue-colored solution. If a $CuF_2$/skeleton matrix material nanocomposite material is desired, this solution may be infiltrated into the skeleton matrix material pores. A vacuum may be applied to help draw the liquid into the small (e.g., C) pores and evaporate the solvent. The process may be repeated one or several times to increase mass loading of $CuF_2$. If the solvent has a significant affinity to $CuF_2$, heating under an inert gas (such as Ar or He) stream or under vacuum at temperatures ranging from 150 to 500° C. may be used. Another method may involve dispersing $CuF_2$ or $CuF_2$/skeleton matrix material nanocomposite (particles) in yet another solvent having a high (e.g., above 150° C.) evaporation point (e.g., ionic liquids) and heat-treating the suspension under an inert gas stream or under vacuum. The exact temperature range of the suitable annealing/heat-treatment conditions depends on the chemistry of the skeleton matrix material and the size of the $CuF_2$ particles. In some examples, annealing (heating) may instead be performed in the presence of $F_2$, HF, or its precursors (such as $NH_4F$).

$CuSiF_6$ is an additional example of a suitable precursor. A non-aqueous solution of $CuSiF_6$ may be first produced and either produced as a powder (particles) or infiltrated into the pores of the skeleton matrix material (in the case of the $MF_x$/skeleton matrix material composite). Upon heating (in an inert environment), $CuSiF_6$ decomposes, producing $CuF_2$ and $SiF_4$ gas.

Several methods may be utilized to prepare an anhydrous $CuSiF_6$ and anhydrous $CuSiF_6$ solution(s). In one approach, CuO may be first dissolved in an aqueous $H_2SiF_6$ solution. The O and $H^+$ combine to form water, resulting in an aqueous $Cu(II)SiF_6$ solution. Drying this solution results in the formation of hydrated $Cu(II)SiF_6$. In a slightly different approach, Cu metal electrodes may be first submerged in an $H_2SiF_6$ aqueous solution and then a current may be passed through the electrodes, such that Cu is oxidized to form $Cu^{2+}$ ions at the positive electrode and $H^+$ ions are reduced to form $H_2$ gas at the other electrode, thus replacing $H^+$ in the solution with $Cu^{2+}$. A particular current and placement of the electrodes far apart, with the positive electrode at the bottom of the electrolyte container, promotes $Cu^{2+}$ formation and $H^+$ reduction instead of $O_2$ evolution and $Cu^{2+}$ reduction.

Once hydrated $Cu(II)SiF_6$ is produced, the water of hydration may be removed by careful heating under controlled conditions. In order to prevent formation of CuO and produce anhydrous $Cu(II)SiF_6$, the water may first be removed (evaporated) from the solution to form hydrated $Cu(II)SiF_6$ crystals and then $H_2O$ may be carefully extracted further. In one example, these hydrated $Cu(II)SiF_6$ crystals may then be dissolved in suitable anhydrous non-aqueous solvent(s). Examples of such a solvent(s) include, but are not limited to, dimethylformamide (DMF), NMP, methanol, or others. A substantial amount of solvent may be used to dilute the water content, or the solution may be repeatedly evaporated at room or elevated temperature (either at atmospheric pressure or under vacuum; in some cases with $F_2$ or HF vapors present) and more anhydrous solvent added to dilute the water content. Water may also be extracted from the hydrated $Cu(II)SiF_6$ by using a conversion (replacement) reaction or by other mechanisms. This non-aqueous salt solution may then be used for impregnating pores of the skeleton matrix material or producing the nanoparticles or nanocomposites. In another example water may be removed by azeotropic distillation of $Cu(II)SiF_6$ solution in a solvent mixture, where one solvent forms an azeotrope with water. Aromatic hydrocarbons (toluene, benzene, etc.) are examples of suitable solvents for this purpose.

In another approach, a replacement (or double replacement) reaction may be utilized. In one example, anhydrous $XSiF_6$ and anhydrous CuY (where X and Y are positively charged and negatively charged ions; each may be either a single ion of magnitude 2 elementary charge or two ions of magnitude 1 elementary charge), may be dissolved in an anhydrous solvent for which both $XSiF_6$ and CuY are soluble but $CuSiF_6$ or XY is insoluble. A precipitated anhydrous $CuSiF_6$ or non-aqueous $CuSiF_6$ solution may be retrieved by decanting. Once precipitated, $CuSiF_6$ may be dissolved in a suitable non-aqueous solvent. A somewhat similar approach may also be used for anhydrous $CuF_2$ formation.

In yet another approach, ion exchange may be performed for anhydrous $CuSiF_6$ formation. In one example, a non-aqueous solvent may be initially used that dissolves $XSiF_6$, CuY, and $CuSiF_6$. (X and Y have the same meanings as described above.) That is, $XSiF_6$ may be dissolved on one side of a cation exchange membrane, and CuY on the other side of the cation exchange membrane. $Cu^{2+}$ will diffuse across the membrane to replace X, which will diffuse across the membrane in the opposite direction. The original CuY solution on the one side of the membrane may be exchanged with fresh CuY solution as the $Cu^{2+}$ concentration depletes and the X concentration increases in this solution, until all X is replaced with $Cu^{2+}$ on the other side of the membrane.

Unfortunately, the low solubility of $CuF_2$ and $CuSiF_6$ found in various solvents may make the methods described above slow, which may be undesirable. The inventors have identified that intermediate formation (or use) of $CuF_2$ precursor particles (e.g., other Cu salts, Cu oxides, Cu carbides, Cu nitrides, Cu metals, etc.) that are later converted to CuF during fluorination reaction(s) may be advantageous in some designs. Such a process of producing metal fluoride-based composite particles (particularly $CuF_2$-comprising particles) is not trivial and has never to their knowledge been used in the synthesis of the related $CuF_2$ (or Cu/LiF) comprising cathodes. Similarly, other metal fluorides as well as mixed metal fluorides may benefit from such an approach.

Figure 6A:
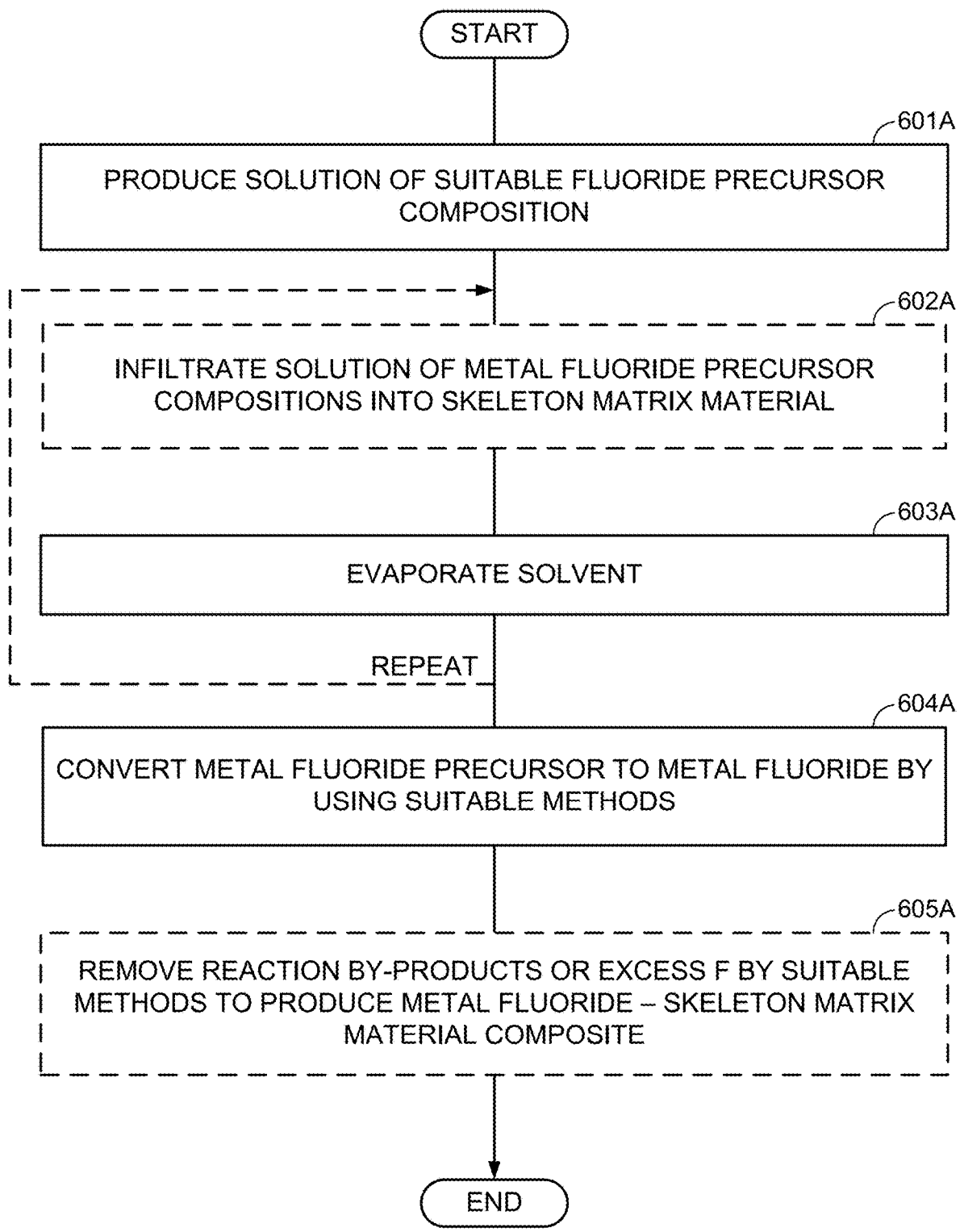
Figure 6B:
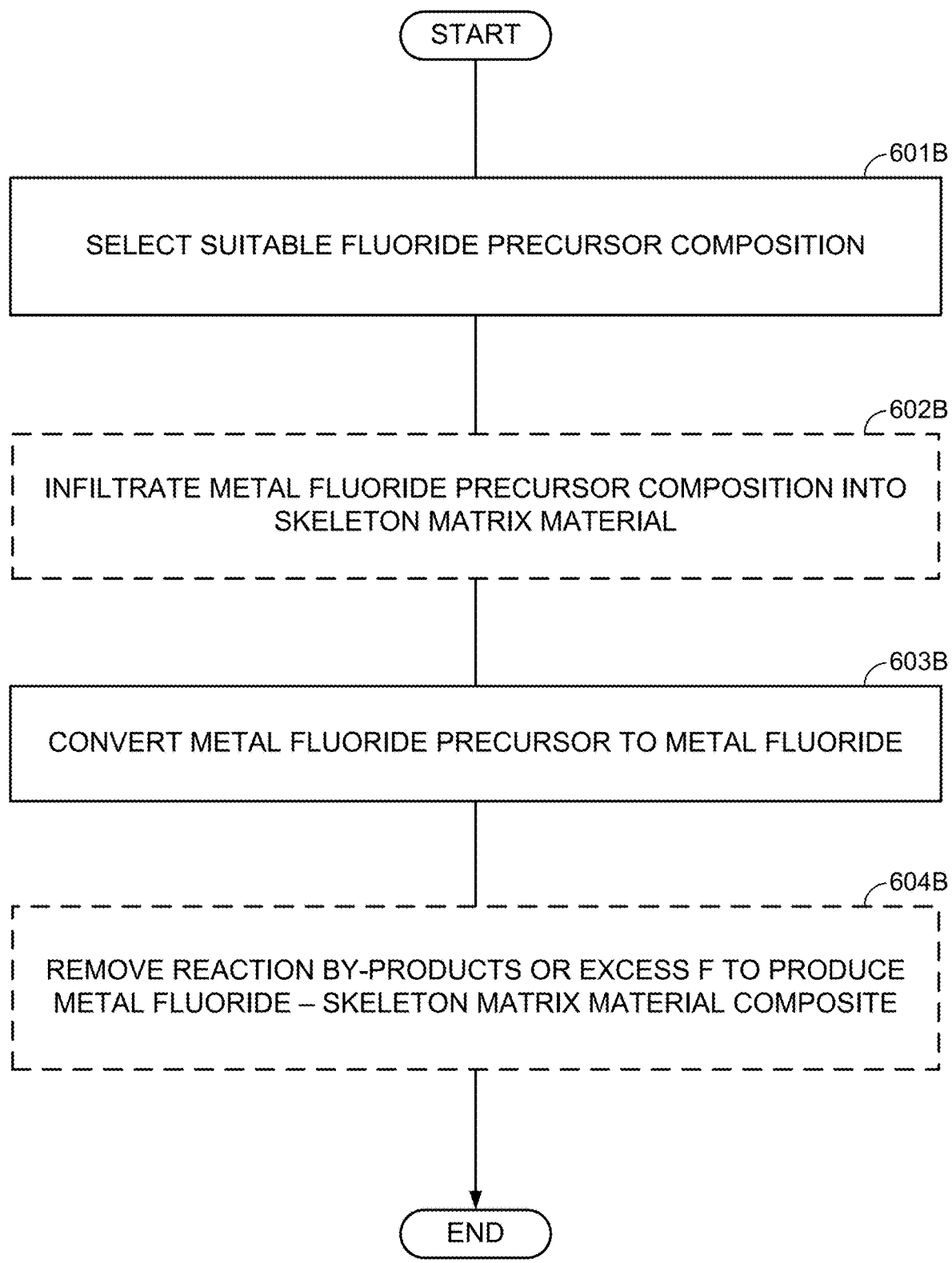

FIGS. 6A and 6B show two examples of another suitable method for the formation of metal fluoride $MF_x$ compositions of the desired size and morphology.

As shown in FIG. 6A, one example method may include the following procedures: (i) preparation of a solution of a fluoride precursor (block 601A); (ii) (optionally) infiltrating such a solution into skeleton matrix material pores or deposition onto the skeleton matrix material surface (optional block 602A); (iii) subsequent solvent evaporation (block 603A) (steps ii and iii may be repeated multiple times to achieve high fluoride loadings); (iv) chemical transformation of the fluoride precursor particles into the metal fluoride (e.g., by fluorination) (block 604A); and (v) (optional) heat treatment or other procedures (e.g., partial reduction) to remove reaction by-products or excess F from the system (optional block 605A).

FIG. 6B illustrates a similar method but involves introduction of the fluoride precursor from the vapor phase (solvent-free): (i) selecting a suitable precursor material (block 601B); (ii) (optionally) infiltrating such a precursor into the skeleton matrix material pores or deposition onto the skeleton matrix material surface via (1) a vapor infiltration, (2) a CVD, or (3) an ALD route (optional block 602B); (iii) chemical transformation of the precursor particles into the metal fluoride (e.g., by fluorination) (block 603B); (iv) (optional) heat treatment or other procedures to remove reaction by-products or excess F from the system (optional block 604B). In some designs, instead of using the porous skeleton matrix material particles and infiltrating them with the fluoride precursor(s), a skeleton matrix material precursor may be added to the fluoride precursor (either prior to or after the fluorination reaction). The skeleton matrix material precursor may be converted to a skeleton matrix material during the fluorination step, during the heat-treatment (annealing) step, or during an additional step (e.g., selective chemical transformation) following the fluorination reaction step.

Suitable examples of metal fluoride ($MF_x$) precursors include, but are not limited to: (i) metals (M) (including mixed metals—e.g., as alloys); (ii) metal oxides ($MOO$ (including mixed metal oxides); (iii) metal nitrides ($MN_z$) (including mixed metal nitrides); (iv) various other metal salts (including mixed metal salts); (v) various metal carbides (including mixed and ternary carbides); and (vi) various combinations of (i), (ii), (iii), (iv), and (v).

Suitable examples of the precursor salts may include, but are not limited to: metal chlorides ($MCl_x$), metal bromides ($MBr_x$), metal nitrates $M(NO_3)_x$, metal fluoroborates ($M(BF_4)_x$), metal sulfates ($M(SO_4)_x$), metal trifluoromethanesulfonate ($M(OSO_2CF_3)_x$), metal iso-butyrate ($M[CO_2CH(CH_3)_2]_x$), metal acetate ($M(O_2CCH_3)_x$), or metal acetylacetonate, to name a few. As previously discussed, examples of the metals in these precursor metals, oxides, nitrides, carbides, and salts may include Cu, Fe, Ni, Co, Ti, Zn, Bi, Pb, Sb, Sn, Cd, Cr, Zr, Nb, Mo, Hf, Ta, Si, La, Ce, and their mixtures. In some designs, high fractions of Cu and Fe may be advantageous for achieving high fractions of $CuF_2$ and $FeF_3$ in the composite cathode particles, which, in turn, results in high energy density of the cells. Precursor salts may be homoleptic or heteroleptic.

As illustrated in the method of FIG. 6A, a solution of the above-described (or other) precursor salts may be infiltrated into the pores of the skeleton matrix material, and the solvent then evaporated. The infiltration solution may comprise a single precursor salt or a mixture of two or more salts containing different metals or ligands. The evaporation of solvent can take place at ambient, reduced, or elevated pressure or temperature, with flow of gas or statically, in order to control evaporation rates. The remaining salt, in the pores of the matrix material, is then converted to $MF_x$ by a chemical reaction (fluorination). In order to increase loading of metal fluorides in the skeleton matrix material the process of infiltration of a precursor salt followed by conversion to metal fluoride may be repeated several times. Each iteration of this process may utilize the same or a different precursor salt or mixture of precursor salts. This repetition may be particularly advantageous when porous skeleton matrix material is used and when a high fraction of the pore filling with $MF_x$ is desired (in order to increase specific or volumetric capacity of the composite cathode material), while preventing formation of $MF_x$ outside the pores of the skeleton matrix material. Formation of $MF_x$ outside the pores of the skeleton matrix material may reduce cell stability and performance and thus may be undesirable.

Fluorination reagents may be solution-based (for example, using a non-aqueous solution of tetrabutylammonium fluoride or tetramethylammonium fluoride, to name a few examples) or gas-phase (for example, using such fluorinating agents as fluorine ($F_2$) or nitrogen fluoride ($NF_3$), to name a few examples).

Several methods may be utilized to generate appropriate reactive species for the effective gas fluorination of the infiltrated salt(s). For example, $NF_3$ gas may be heated (e.g., above around 200° C.) to decompose into F and $NF_2$ radicals. Such radicals may transform precursor salt(s) to metal fluorides. For example, transform metal chloride(s) (e.g., $FeCl_2$ or $CuCl_2$ or their mixtures, etc.) into metal fluorides (e.g., $FeF_2$ or $CuF_2$ or their mixtures, etc., respectively).

Fluorination via the decomposition of $NF_3$ gas or by using other fluorinating gases may be performed in either a static reaction vessel (no fluorinating gas flow) or one that has continuous flow of a fluorinating (e.g., $NF_3$) gas.

In some designs, particles may be agitated during the fluorination reaction to increase uniformity of the fluorination. In some designs, a rotary-type reactor (e.g., rotary kiln reactor) may be used for powder agitation purposes. In some other designs, a mixer may be utilized for powder agitation. In some designs, vibrations of the reactor may be utilized for powder agitation. In some designs, the flow of gas may be utilized for powder agitation (e.g., as in a fluidized bed reactor).

Alternatively to $NF_3$, other gases (e.g., $ClF_3$, $SF_6$, and $F_2$ gas) may also be used for the fluorination. An alternative method to using $F_2$ is to generate fluorine or fluorine radicals in-situ (to minimize the safety hazard of $F_2$), such as via the electrolysis of anhydrous hydrogen fluoride (HF), or an RF or microwave plasma source to break apart fluorine bearing gasses such as $NF_3$, $ClF_3$, or $SF_6$. The use of plasma-assisted fluorination may be particularly attractive due to its high efficiency, high rate, and low temperature.

Fluorination of precursor salt compositions (including salts infiltrated into the porous skeleton matrix material) via the breakdown of $NF_3$ by an RF remote plasma source was found to be a highly effective fluorination method that can be used over a wide range of temperatures (e.g., from below room temperature up to over 200° C.).

Figure 7:
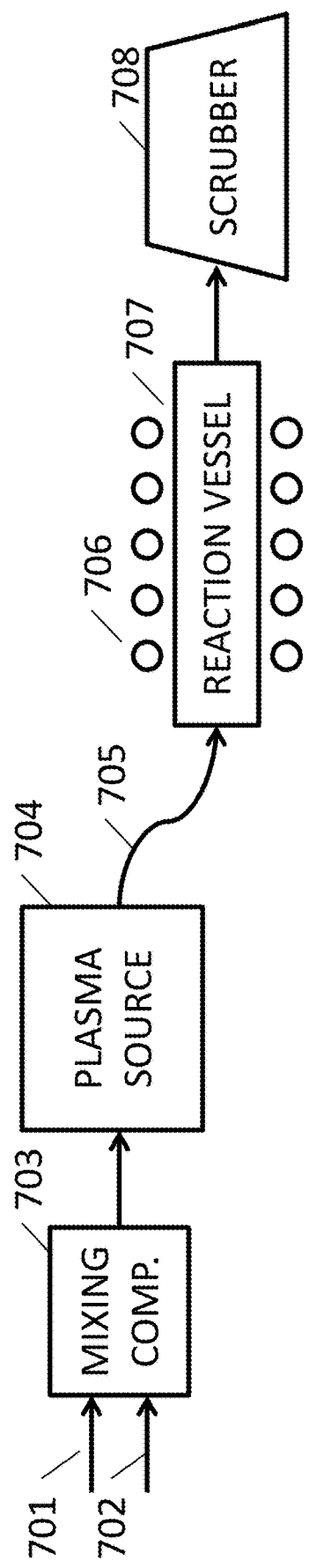
FIG. 7 illustrates an example of a plasma-based fluorination setup.

FIG. 7 illustrates an example of a suitable experimental setup for plasma-assisted fluorination reaction. The fluorine generated by the remote plasma source 704 is stable and can be easily piped 705 into a reaction vessel 707 located inside an optional heater (e.g., tube furnace) 706. By controlling the mixture of a non-reactive carrier gas (such as $N_2$, Ar, or He) 702, and the fluorine-bearing gas 701 by controlling their concentration and flow rates, one can vary the concentration of fluorine and fluorine radicals within the reaction vessel. These non-reactive and reactive gases may be mixed in a separate compartment 703. The amount of fluorine-bearing gas may be changed from 0% to 100% of the total gas stream. The pressure and flow rate of the fluorine-bearing gas and carrier gas mixture 703 is dependent on the plasma source configuration and (in case of the flow rate) dependent on the reactor size, but the pressure may typically be in the range of 0.07-7 kPa (about 0.5-50 Torr). RF plasma source power depends on the reactor size and may range from below 0.1 kW to over 10,000 kW (for a small laboratory reactor, the power is typically below 10 kW, but for large-size industrial equipment it may be significantly larger). Abatement of the unreacted fluorine, and any fluorine products, may be conducted in a separate compartment (e.g., a scrubber 708). In some designs, post-fluorination annealing (in the temperature range from about 40° C. to about 700° C., depending on the chemical composition of the composite particles and fluorination reaction conditions) may be utilized in order to remove excess F (e.g., F bonded to the skeleton matrix material) or other by-products from the produced composites. In some designs, it may be advantageous to coat the fluorinated particles by a protective surface layer (e.g., carbon or hyrdocarbons) in order to enhance their stability. In some designs, such a protective coating may be deposited by exposing the composite to a stream of a hydrocarbon gas (e.g., in the temperature range from about room temperature to about 700° C.). In some designs, such a coating may be deposited in the same "fluorination" reactor. In some designs, the subsequent processing steps (e.g., lithiation, shell formation, etc.) on the produced composite (e.g., M-LiF or M-LiF-skeleton matrix material) particles may be advantageously conducted if the produced composite particles are not exposited to air or moisture prior to completion of these additional steps.

In many designs, it may be highly advantageous to preserve the overall shape of the precursors during the fluorination or lithiation reactions. If the precursors are infiltrated into the pores of the skeleton matrix material, it may be particularly advantageous for the fluorinated or lithiated particles to remain within such pores because remaining within the pores enhances performance (rate, stability, etc.) of the metal fluoride-based battery electrodes. Unfortunately, fluorination, lithiation, or other chemical or physical processing steps may cause diffusion of the metal fluoride or its precursors from the interior of the porous matrix material (presumably to minimize the surface area of the nanoparticles; the energy for such undesirable mass transport may be provided by the heat supplied to the reaction vessel or generated during exothermic chemical reaction; in the case when the conversion process takes place in a solution, it is also possible that at least one intermediate species involved in such a conversion reaction may possess a sufficiently high solubility to migrate from the pores prior to precipitation on the outer surface of the particles). Processes may include measures to prevent diffusion of the metal fluoride or its precursors from the interior of the matrix material. An example of such a process is a conversion of an infiltrated precursor salt to another precursor with a higher melting point to lower mobility at elevated temperatures. Specifically, a metal nitrate salt may be infiltrated into the matrix material followed by heating in the presence of $O_2$ to at least partially convert the metal nitrate to a metal oxide. This process may be conducted once or repeated multiple times to increase loading of a metal oxide in the skeleton matrix material before subsequent fluorination. Another example includes the co-infiltration of multiple metal salts together. It is hypothesized that the observed improved performance and stability of the mixed precursors during such transformation reactions may be related to changes in the thermodynamics or kinetics of the fluorination (or lithiation) reactions or other processes that are leading to reduced mobility (and the resulting reduced out-diffusion from the skeleton material pores).

Figure 8:
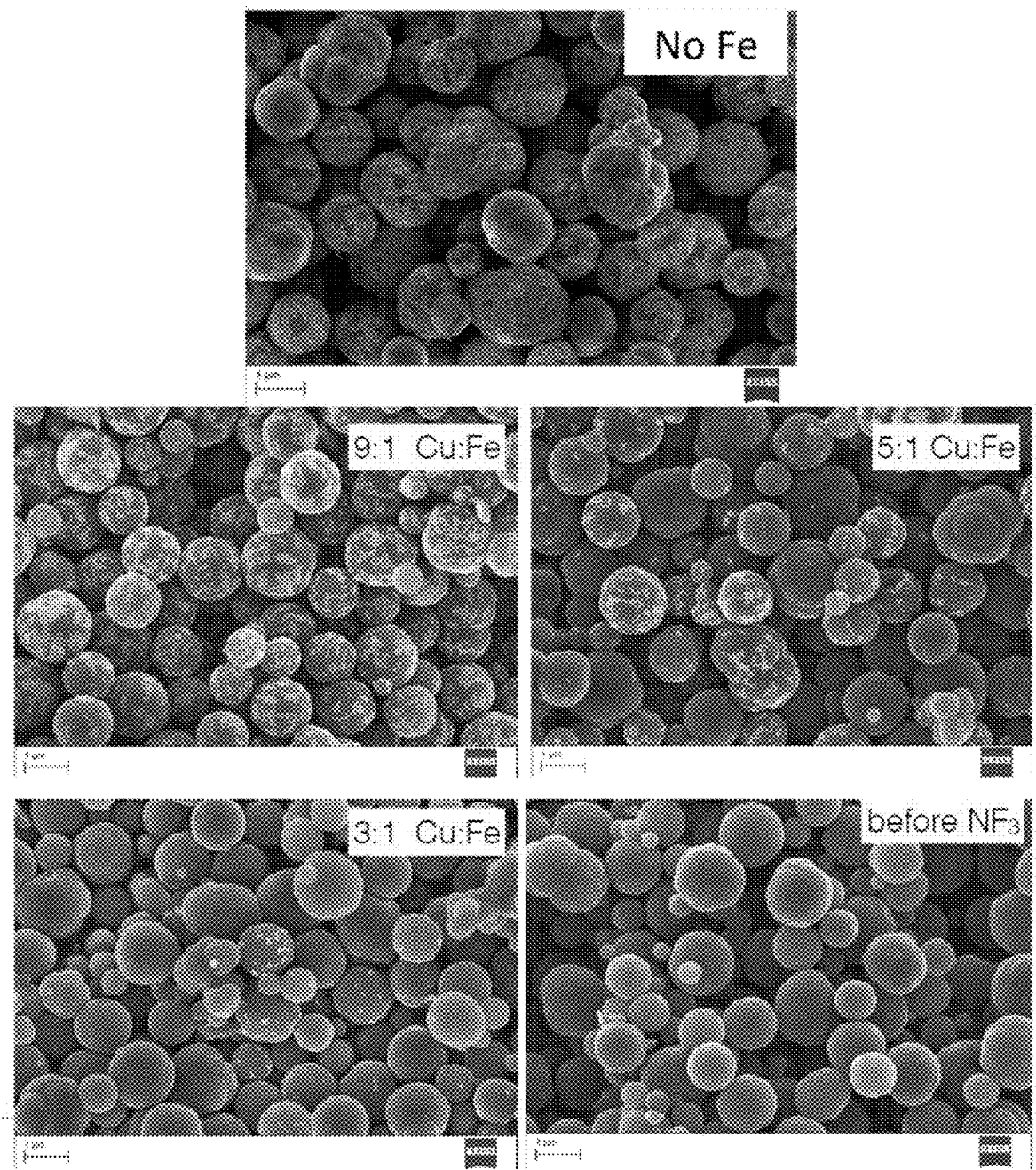
FIG. 8 is a set of scanning electron microscopy (SEM) images illustrating the impact of using mixed precursors on the retention of metal fluoride nanoparticles within micronscale skeleton matrix particles during precursor conversion to fluorides.

FIG. 8 illustrates an example of the effect of the co-infiltration of $CuCl_2$ and $FeCl_3$ into the porous micron-scale spherical skeleton matrix particles prior to fluorination. As shown by comparison of the scanning electron microscopy (SEM) images, while the use of pure $CuCl_2$ as a fluoride precursor infiltrated into the porous skeleton matrix particles resulted in a large portion of linked $CuF_2$ nanoparticles on the outer surface of the skeleton particles (after the fluorination reaction using $NF_3$ as a fluorine source), the addition of $FeCl_3$ into $CuCl_2$ fluoride precursor (in amounts corresponding to 9:1, 5:1, and 3:1 Cu:Fe weight ratios) significantly reduced the (nano) particle migration from the pores to the outer surface under identical fluorination conditions.

Direct contact of MF, M, or LiF with the electrolyte may induce many undesirable side-reactions. Such reactions are particularly rapid with some of the MF, such as CuF. For example, when Cu metal is exposed to the electrolyte, it may oxidize and dissolve as $Cu^{1+}$ and $Cu^{2+}$ species at 3.56V versus Li/Li+ and 3.38V vs. Li/Li+, respectively (cited are the standard oxidation potentials with 1M $Cu^+$ or $Cu^{2+}$ in solution). Unfortunately, these Cu oxidation potentials are very close to the redox potential for the conversion reaction of LiF and Cu metal to $CuF_2$ of 3.55V vs. Li/Li+. Thus, the formation of $Cu^+$ and $Cu^{2+}$ may occur alongside the desired redox reaction, unless steps are taken to prevent Cu metal dissolution. Besides causing the loss of Cu in the electrode, the formation of $Cu^+$ and $Cu^{2+}$ in solution may also encourage the dissolution of LiF through the formation of $[Cu(I)F_4]^{3-}$ or $[Cu(II)F_6]^{4-}$ species and also damage the SEI on the anode. Other $MF_x$ may similarly suffer from such limitations. Formation of Li permeable shells around the LiF/M or LiF/M/skeleton matrix material nanocomposite (particles) may overcome these issues and prevent the dissolution of the active material.

FIGS. 9A-9F illustrate examples of suitable shells in LiF-, M-, or MFx-comprising composites.

FIG. 9A illustrates a shell 901 that may comprise a protective layer 902 formed from a material that is substantially impermeable to electrolyte solvent molecules. The shell may comprise a protective layer 902 formed from a material that is substantially impermeable to the ions of metals of the metal clusters or nanoparticles of the active material. The thickness of the shell 901 may range from about 1 nm to about 10 microns (in some designs, the shell thickness may preferably range from about 1 nm to about 100 nm). In some application where maximum energy density is desired, the shell thickness may preferably comprise from about 0.05% to about 20% of the radius of the composite particles.

The shell may comprise carbon, for example. The shell may be solely made of mostly graphitic ($sp^2$-bonded) carbon or have an outer layer composed of graphitic (electrically conductive) carbon. The shell may comprise an active (e.g., Li storing) material layer, wherein the active material layer is formed from a different active material than in the core of the particles. The shell may comprise an intercalation-type active material, where accessible Li capacity, for example, of the intercalation material in the potential range of the cathode operation in a cell may range from about 0.1 mAh/g to about 300 mAh/g (where the low capacity may originate from Li intercalation in a different potential than that of the cathode operation). Examples of suitable lithium intercalation-type materials may include, but are not limited to various materials having a layered, spinel, olivine or tavorite crystal structure (such as lithium cobalt oxide, various lithium manganese oxides, various lithium nickel cobalt manganese oxides, various lithium cobalt aluminum oxides, various lithium polyanion compounds, such as various lithium phosphates, various lithium silicates, various other lithium compounds that comprise, for example, large ($XO_4$, where X may be P, Si, As, Mo, W, S, etc.) anions, including those that comprise F in their crystal structure). The shell may also comprise a Li-free intercalation-type material, which is stable in the potential range of the core-shell cathode operation. Examples of suitable Li-free intercalation-type materials may include but are not limited to various oxides, nitrides and sulfides, to name a few. The active material of the active material layer may have a substantially lower capacity relative to the active fluoride material.

FIG. 9B illustrates another example, where the shell 901 may comprise a porous layer 903 having a smaller average pore size than the skeleton matrix material. Pores 904 in the porous layer 903 of the shell 901 may be at least partially infiltrated with a metal fluoride 905, including a lithium fluoride. In another example, the pores in the porous layer of the shell may be at least partially filled with intercalation-type active material 906. In another example, the pores in the porous layer of the shell may be at least partially filled with a material that does not undergo conversion reaction within the potential range of the cathode operation.

FIG. 9C illustrates another example, where the shell 901 may be a composite material comprising an inner layer 907 and an outer layer 908. The inner layer may be a porous layer, for example, having a smaller average pore size than the skeleton matrix material, and the outer layer may be, for example; (i) a protective layer formed from a material that is substantially impermeable to electrolyte solvent molecules or (ii) an active material layer formed from an active material that is different from the active material (such as lithium fluoride material intermixed with specific metal clusters or metal nanoparticles) in the bulk of the composite particles.

FIG. 9D illustrates another example, where the shell 901 may be a composite material comprising two or more materials (e.g., material 909 and material 910) arranged in an interpenetrating configuration such that each of the materials of the composite material contacts the lithium fluoride or the skeleton matrix material (if present).

FIG. 9E illustrates another example, where at least the top layer 911 of the multi-layered shell 901 may comprise conductive carbon.

FIG. 9F illustrates yet another example, where the shell 901 may have a gradually changing composition from the surface towards the center of the composite particles.

In some designs, each composite particle may further comprise external channel pores extending from an outer surface of the skeleton matrix material towards the center of the skeleton matrix material, providing channels for diffusion of the ions into the active material disposed within the skeleton matrix material. At least some portion of the external channel pores may be filled with (i) a porous material having a different microstructure than the skeleton matrix material; (ii) an active material that does not undergo conversion reaction in the potential range of the composite cathode operation; and/or (iii) a solid electrolyte material. The surface of the external channel pores may be coated with a thin (from about 0.3 nm to about 50 nm) layer of (i) electrically conductive material; (ii) an active material that does not undergo conversion reaction in the potential range of the composite cathode operation; and/or (iii) a solid electrolyte material.

In some designs, shells may be deposited (at least, in part) by using one of the gas deposition methods, such as CVD or ALD. In some designs, the shell formation may involve multiple steps, where initially the shell precursor is first deposited conformally in a solution and then transformed (at least, in part) into the shell material via thermal decomposition and/or chemical reaction. In some designs, multiple approaches may be combined in order to produce conformal, essentially defect-free shells around individual particles. In some designs, shells may be deposited electrochemically (for example, after the electrodes comprising the M/LiF or M/LiF/skeleton matrix material-composite particles are assembled). In some designs, the shells may be deposited on electrodes comprising M/LiF or M/LiF/skeleton matrix material composite(s), in turn, produced by chemical or electrochemical lithiation of the corresponding $MF_x$ or $MF_x$/skeleton matrix material composites.

In some designs, M/LiF or M/LiF/skeleton matrix material (nano)composite particles may exhibit a hierarchical architecture for improved stability or performance in cells.

In some designs, M/LiF or M/LiF/skeleton matrix material (nano)composite particles may exhibit a gradually changing composition for improved stability or performance in cells. In some examples, the volume fraction of the skeleton matrix material may increase (substantially, e.g., by 10% to 500%) near the surface of the (nano)composite particles or be reduced (substantially, e.g., by 10% to 500%) in the center of the (nano)composite particles. In some examples, the size of pores in the skeleton matrix material may reduce near the surface of the (nano)composite particles or be enlarged in the center of the (nano)composite particles. In some examples, one large central void may exist in the skeleton matrix material. Such a void may be partially (or completely) filled with M/LiF composite.

In some designs, an excess of M atoms (relative to LiF and the corresponding $MF_x$ formation) in M/LiF or M/LiF/skeleton matrix material composites may be advantageous, such as in applications requiring higher rate performance. This excess of M atoms may provide increased electrical conductivity and also serve as sites for heterogeneous nucleation and growth of M during the lithiation of MF, thus reducing nucleation barrier and correspondingly reducing voltage hysteresis, and improving rate performance. In some designs, this excess of M atoms may be selected from those metals that have weaker bonding to F (more electropositive to the majority of M used in the electrochemical reaction) so that the "excess" M does not tend to get fluorinated.

In some designs, selected metal fluorides (such as $MgF_2$ and NaF) may be added to LiF as "dopants" in order to improve rate performance (e.g., by serving as sites for heterogeneous nucleation of LiF during lithiation of (e.g., transition) metal fluorides). In one illustrative example, up to approximately 3% of $MgF_2$ (relative to LiF) may be added to provide performance improvements. In another illustrative example, up to approximately 0.1% of NaF relative to LiF may be added.

Figure 10:
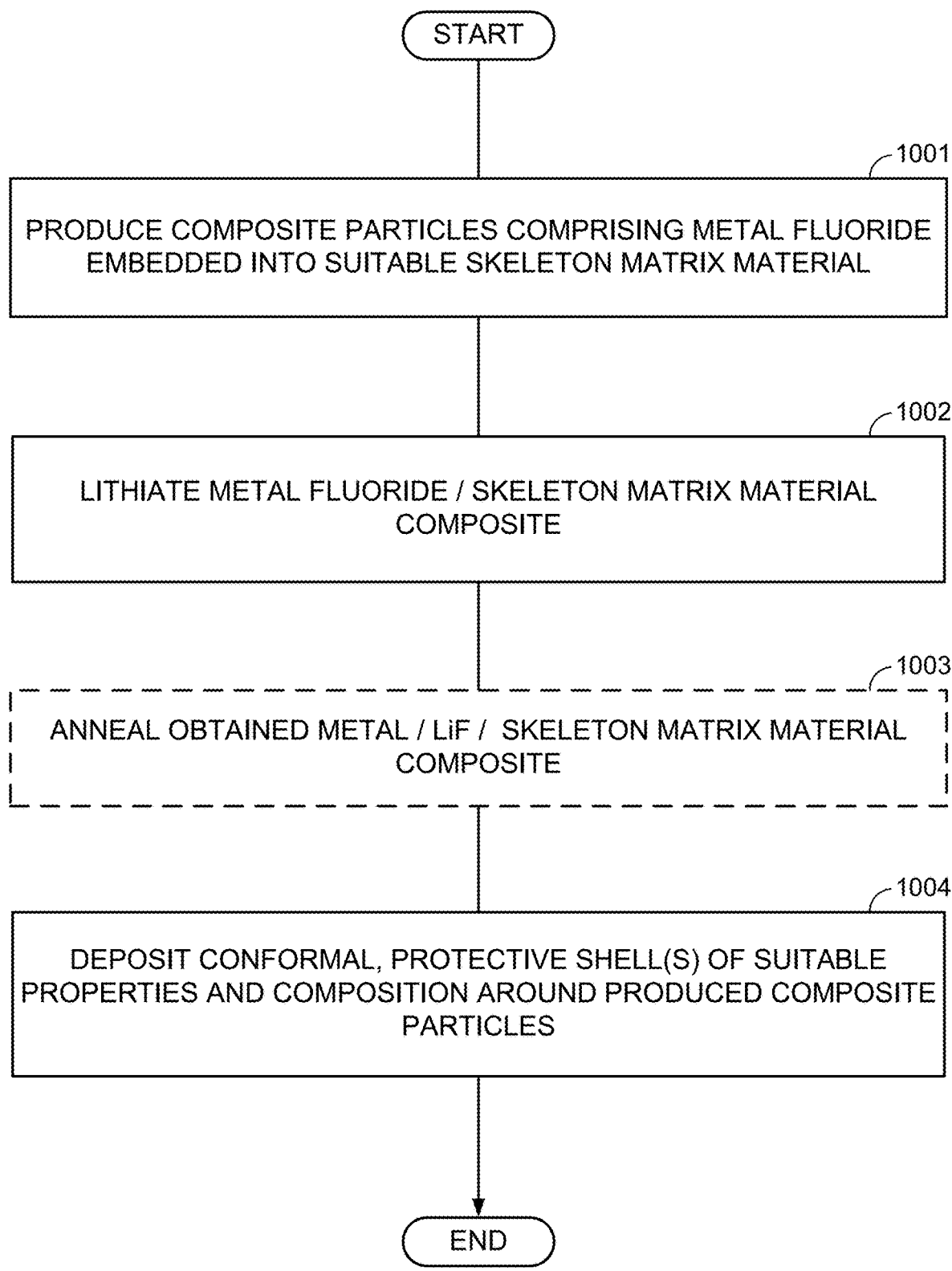
FIGS. 10-13, 14A-14B, and 15A-15B illustrate example methods for fabricating M/LiF-comprising composite electrodes.

FIG. 10 is a flow chart illustrating an example method of fabricating a M/LiF-containing material for use in battery electrodes. In this example, the fabrication method includes: (i) embedding the metal fluoride material into a supportive skeleton matrix material (or a skeleton matrix material precursor), thus forming a composite metal fluoride-skeleton matrix material (block 1001); (ii) lithiation of the composite to produce LiF material intermixed with specific metal clusters or metal nanoparticles within the pores of the skeleton matrix material (block 1002); (iii) (optionally) annealing the produced composite at temperatures above about 100° C. and below about 700° C. (optional block 1003); and (iv) depositing a protective shell at least partially encasing the LiF/M/skeleton matrix material composite (block 1004).

Figure 11:
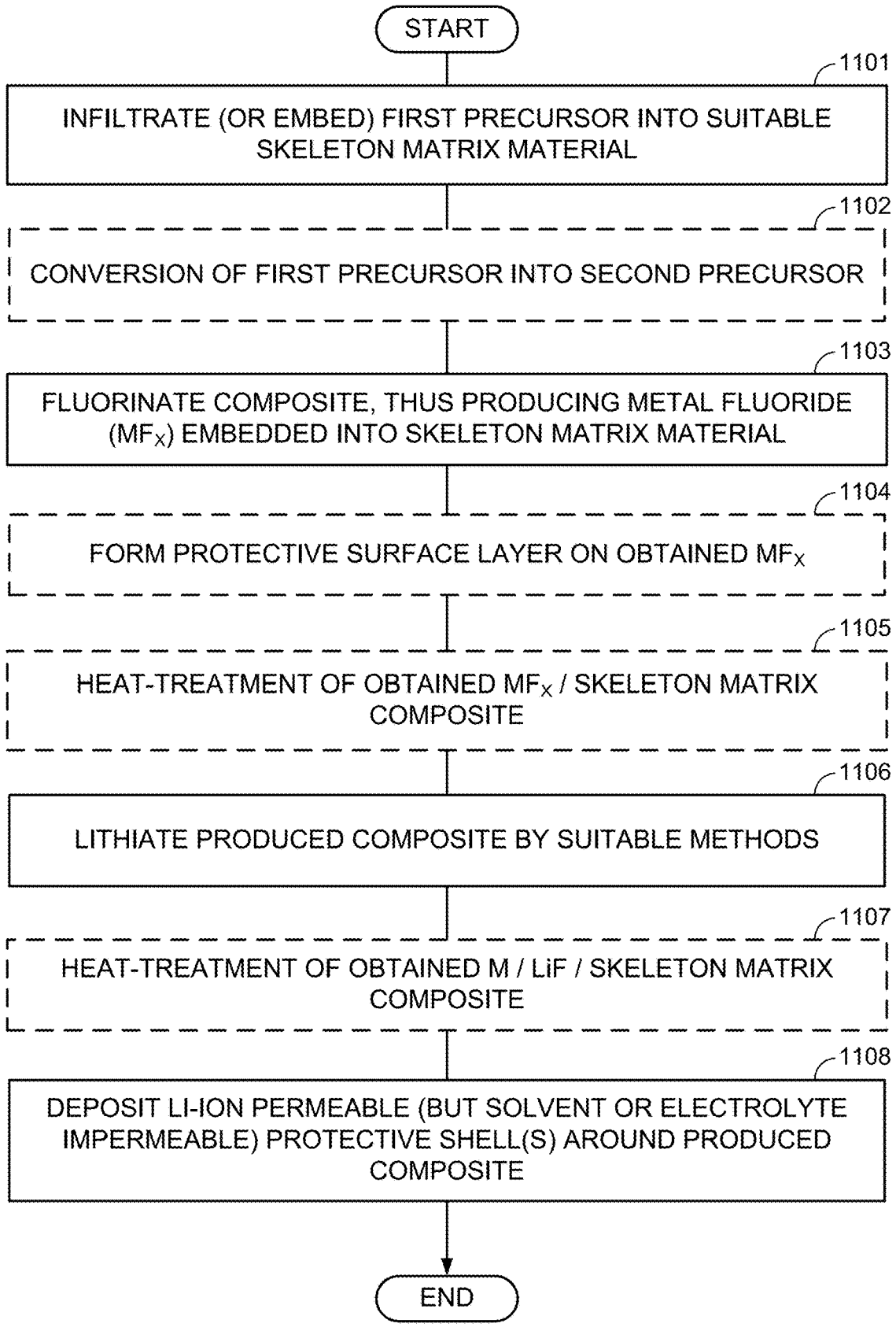

FIG. 11 is a flow chart illustrating another example method of fabricating a M/LiF-containing material for use in battery electrodes. In this example, the fabrication method includes: (i) embedding a first precursor (e.g., a metal salt or mixture or solid solution of salts or pure metal) material into the pores of a porous supportive skeleton matrix material (or a skeleton matrix material precursor) (e.g., by infiltration from vapors, from a solution, or by a CVD or ALD reaction), thus forming a composite first precursor—skeleton matrix material (block 1101); (ii) (optional) conversion of the first precursor to a second precursor (e.g., a metal oxide, metal carbide, metal nitride, another metal salt, etc.) that exhibits more favorable properties during fluorination (e.g., reduced mobility, reduced heat of formation, or faster/more complete fluorination, etc.) (optional block 1102); (iii) fluorination of the precursor with the formation of a metal fluoride ($MF_x$) (or fluoride mixture) (e.g., using plasma-assisted fluorination setup or by other fluorination methods) (block 1103); (iv) (optional) protective surface layer formation (optional block 1104); (v) (optional) heat-treatment or other post-processing to remove excess F (e.g., if matrix material undesirably becomes partially fluorinated) or other by-products (optional block 1105); (vi) chemical lithiation of the composite to produce LiF material intermixed with specific metal clusters or metal nanoparticles within the pores of the skeleton matrix material (and, in some designs, to modify the composition of the skeleton matrix material) (block 1106) (e.g., by using a solution of lithium triethylborohydride, lithium tri-sec-butylborohydride, n-butyllithium, sec-butyllithium, tert-butylliuthium, tri-n-butyllithium magnesate, lithium dibutyl(isopropyl)magnesate, lithium naphthalide, lithium benzophenone ketyl, lithium aluminum hydride, lithium borohydride or by other methods); (vii) (optional) heat-treatment (annealing) the produced composite at temperatures above about 100° C. and below about 700° C. (e.g., under inert environment) (optional block 1107); and (viii) depositing a protective shell at least partially encasing the LiF/M/skeleton matrix material composite (e.g., by CVD reaction or other suitable methods) (block 1108).

Figure 12:
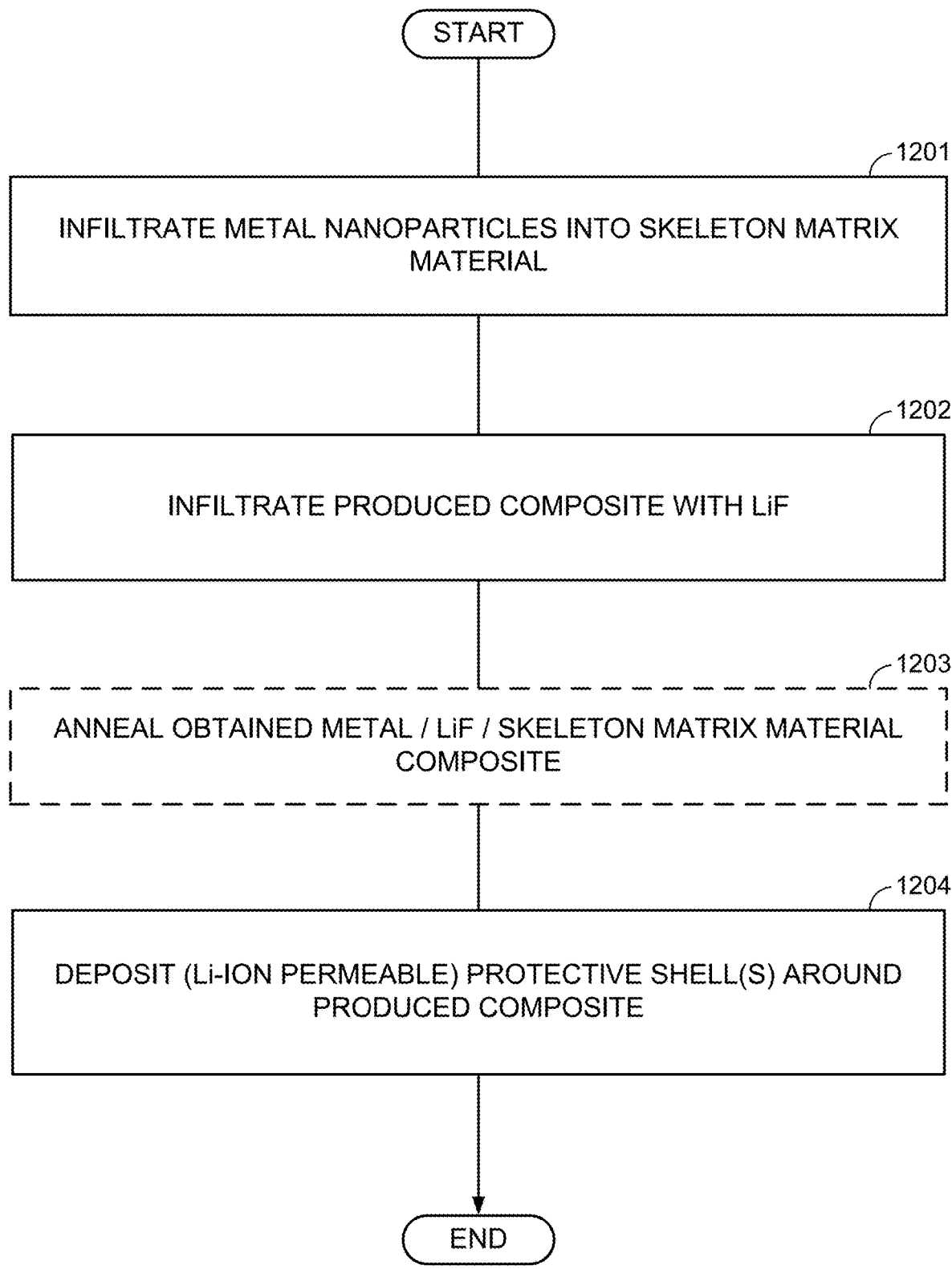

FIG. 12 is a flow chart illustrating another example method of fabricating a M/LiF-containing composite for use in battery electrode(s). In this example, the fabrication method includes: (i) infiltrating a porous skeleton matrix material (for example, in the form of porous particles) with metal clusters or metal nanoparticles (block 1201); (ii) infiltrating the obtained skeleton matrix material/metal nanocomposite with LiF (block 1202); (iii) (optionally) annealing the produced composite at temperatures above about 100° C. and below about 700° C. (optional block 1203); and (iv) depositing a protective shell at least partially encasing the LiF-M-skeleton matrix material composite (block 1204).

Figure 13:
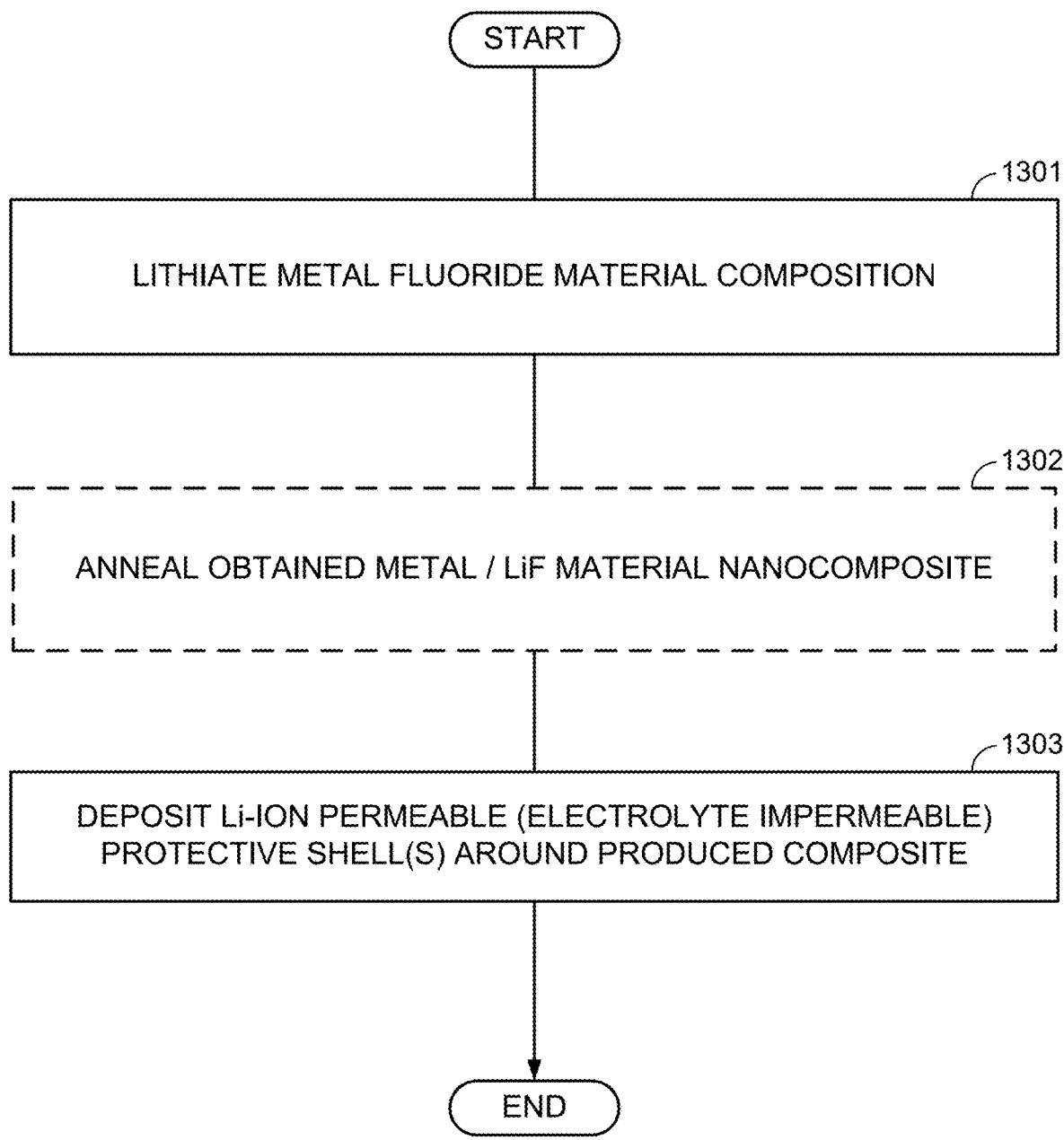

FIG. 13 is a flow chart illustrating another example method of fabricating a M/LiF-containing composite for use in battery electrode(s). In this example, the fabrication method may include: (i) lithiation of a metal fluoride material to produce LiF material intermixed with metal clusters or metal nanoparticles (block 1301), where the metal fluoride material may be in the form of individual particles or in the form of agglomerates of particles, and may comprise different metal fluorides; (ii) (optionally) annealing the produced composite at temperatures above about 100° C. and below about 700° C. (optional block 1302); and (iii) depositing a protective shell at least partially encasing the LiF/M/skeleton matrix material composite (block 1303).

Figure 14A:
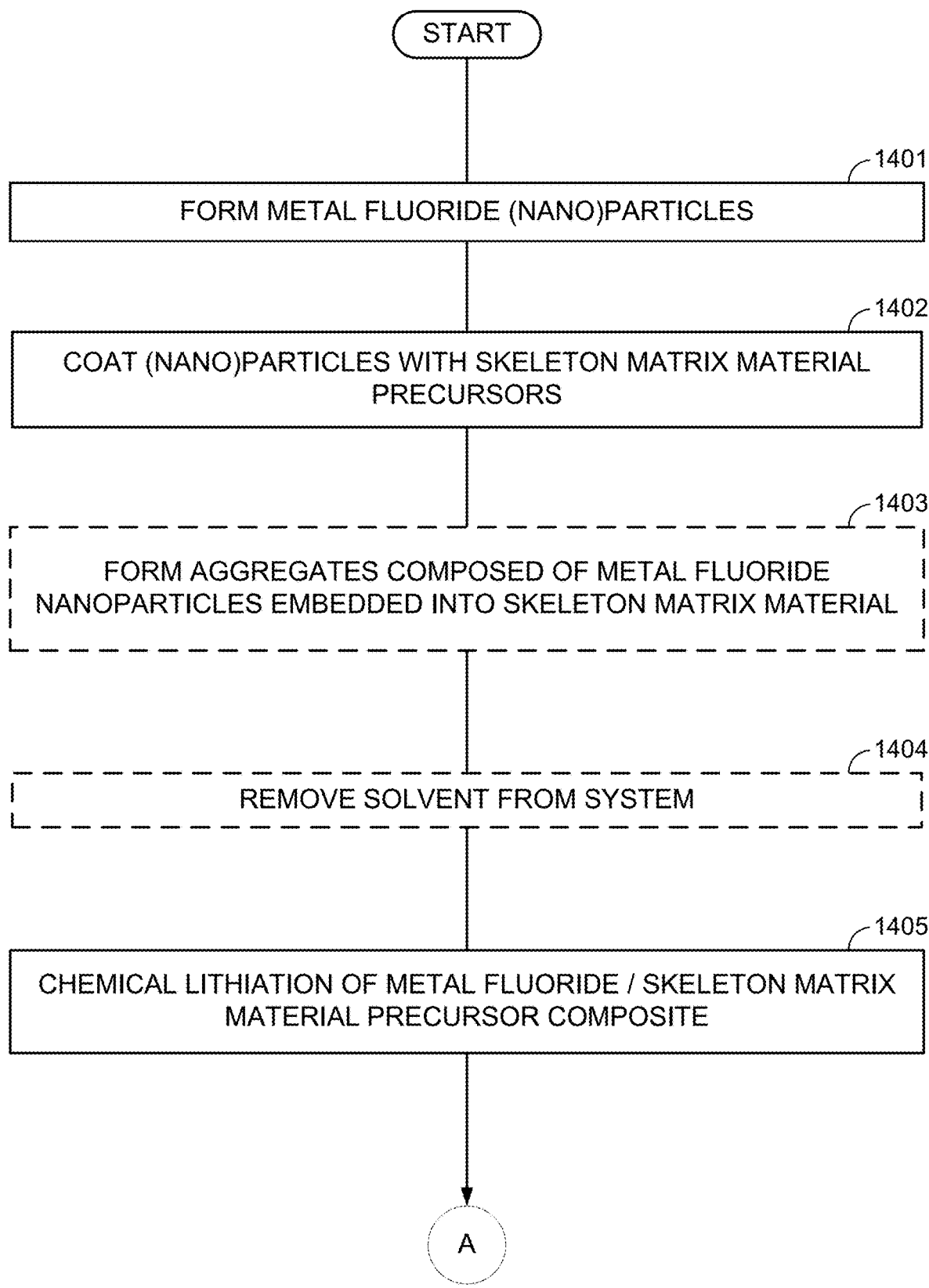
Figure 14B:
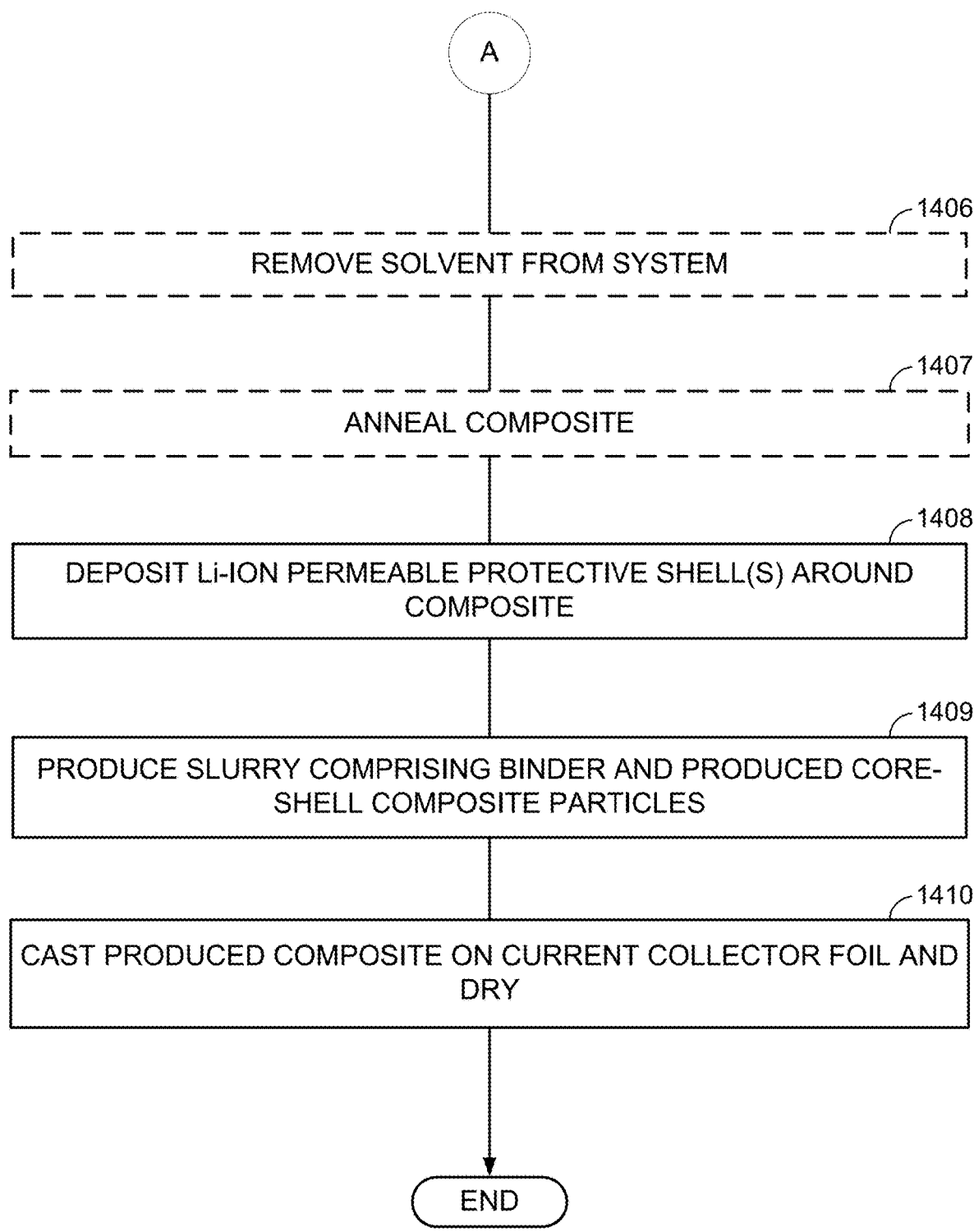

FIGS. 14A-14B depict a flow chart illustrating an example method of fabricating a M/LiF-containing composite electrode. In this example, the fabrication method may include the following: (i) precipitating or forming nanoparticles (particles below 1 micron in diameter) comprised of metal fluoride(s) (e.g., from a solution or by converting precursor nanoparticles into metal fluoride(s) by fluorination) (block 1401); (ii) coating these metal fluoride nanoparticles with a skeleton matrix material precursor layer in a solution or in a vapor phase (block 1402); (iii) (optionally) forming agglomerates composed of the fluoride nanoparticles embedded within the skeleton matrix material precursor (optional block 1403) (it will be appreciated that this block may take place simultaneously with block 1402); (iv) (optionally) removing (e.g., by centrifuging, filtering, and/or evaporating) or replacing a solvent from the system (optional block 1404); (v) chemically lithiating the composite particles to produce LiF material intermixed with specific metal clusters or metal nanoparticles and embedded into the skeleton matrix material precursor (block 1405); (vi) (optionally) removing (e.g., by centrifuging, filtering, and/or evaporating) a solvent from the system (optional block 1406); (vii) (optionally) annealing the composite at elevated temperature (for example, from about 70 to about 700° C.) (optional block 1407); (viii) depositing a protective surface shell layer around individual particles (block 1408); (ix) producing a slurry comprising the produced core-shell composite particles and a binder solution (block 1409); and (x) casting the electrode on a metal foil current collector from the produced slurry and drying it, thus producing a battery electrode (block 1410).

Figure 15A:
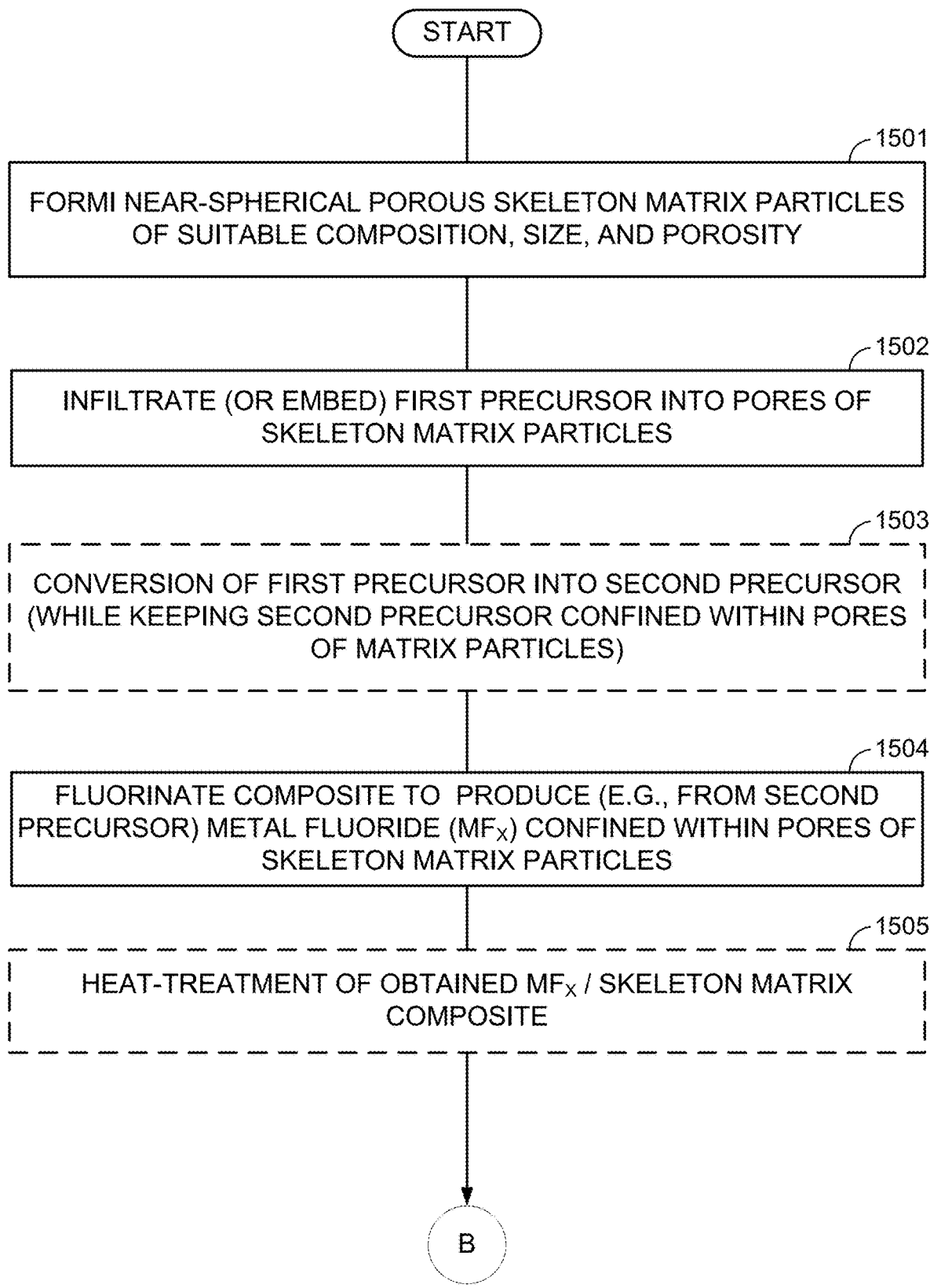
Figure 15B:
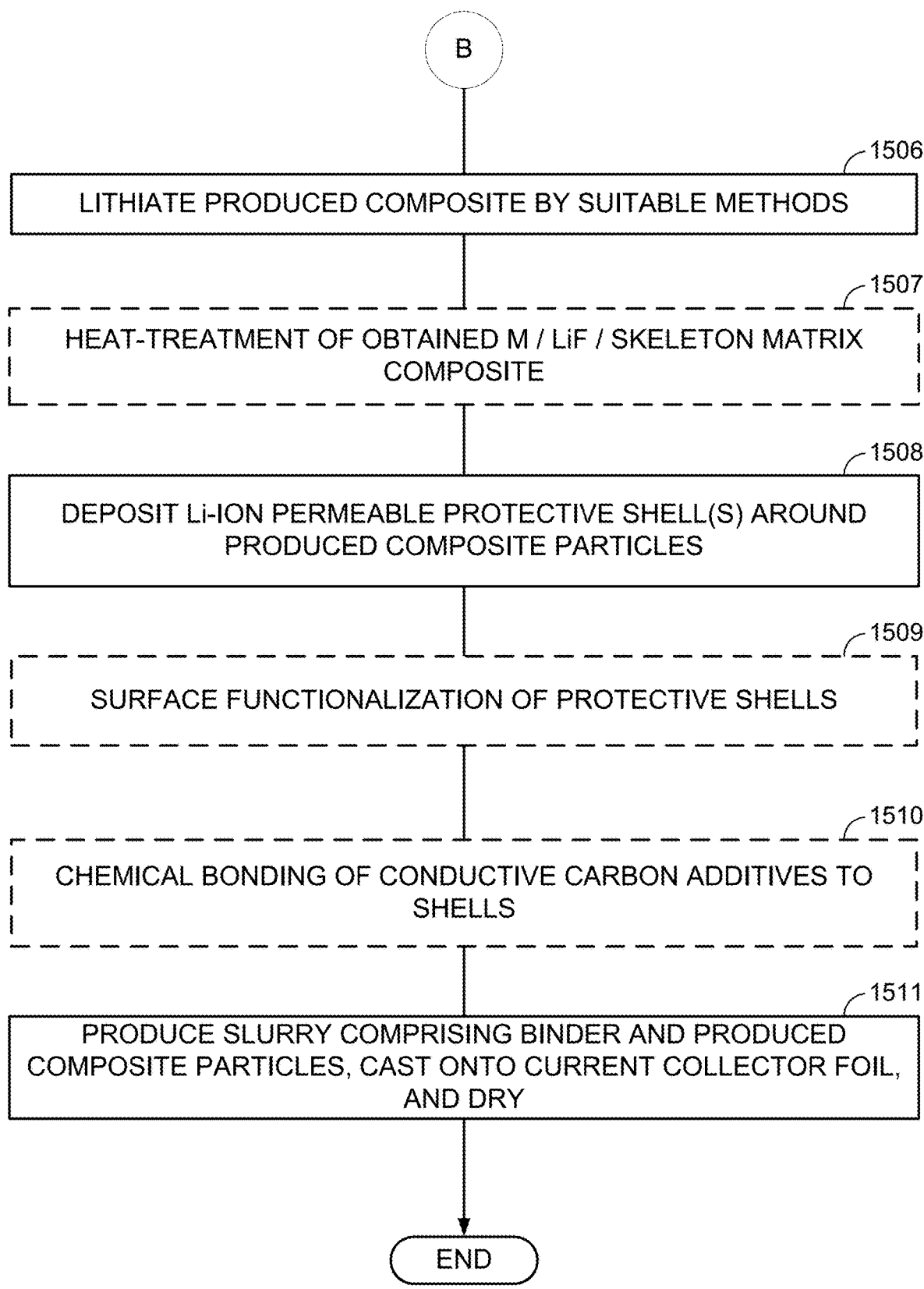

FIGS. 15A-15B depict a flow chart illustrating another example method of fabricating a M/LiF-containing composite electrode. In this example, the fabrication method may include the following: (i) forming spherical particles of the porous skeleton matrix material of suitable composition (block 1501); (ii) infiltrating the pores of these porous particles with a first suitable precursor (e.g., metal salt(s) or others) (block 1502); (iii) (optionally) converting the first suitable precursor to a second suitable precursor with more favorable properties (e.g., by heat-treatment, oxidation, reduction or other methods) in such a way as to keep the second precursor largely confined within the pores of the skeleton matrix material (optional block 1503); (iv) fluorinating the composite, thus producing metal fluorides largely confined within the pores of the skeleton matrix material (block 1504); (v) (optionally) removing by-products of the fluorination reaction or excess F from the system (e.g., by heat treatment or other methods) (optional block 1505); (vi) lithiating the produced composite by suitable methods under suitable conditions to produce a mix of LiF and metal(s) confined within the pores of the skeleton matrix material (block 1506); (vii) (optionally) removing by-products of the lithiation reaction (e.g., by heat treatment or other methods) (optional block 1507); (viii) depositing conformal protective shells of suitable composition by suitable methods around the composite spherical particles in such a way as to retain LiF and metal(s) within the pores of the skeleton matrix material (block 1508); (ix) (optionally) functionalizing at least a portion (e.g., 0.01-100%) of the outer surface of the protective shells with functional groups in such a way as not to damage the integrity of the shell and not to alter the composition of the metal(s) and LiF (optional block 1509); (x) (optionally) chemically bonding conductive (e.g., carbon) additives (e.g., carbon nanotubes, carbon black, carbon fibers, graphene, graphite flakes, etc.) to the outer surface of the produced spherical core-shell particles (optional block 1510); (xi) producing a slurry comprising a binder and the produced composite particles, casting it onto a current collector foil (e.g., Al foil), drying, and optionally calendaring (densifying) (block 1511).

In some designs, the skeleton matrix material may comprise 20-100 at. % carbon. In some designs, forming the skeleton matrix material may comprise, for example, forming a carbon-containing precursor, (optionally) oxidizing and carbonizing the carbon-containing precursor to form a carbonized particle, and activating the carbonized particle at elevated temperature to form the skeleton matrix material with a pore volume of greater than 50 vol. %.

In some designs, at least an outer portion of the shell may be deposited electrochemically during one or more initial battery cycles, during which electrochemical decomposition of at least some electrolyte components occurs.

In some designs, the protective layers or protective shells (or coating(s)) may be deposited from a vapor phase via vapor deposition methods. Examples of such methods include, but are not limited to, chemical vapor deposition (CVD), atomic layer deposition (ALD), plasma-enhanced ALD, plasma-enhanced CVD, vapor infiltration, and others. For some designs, the protective layer or protective shell material(s) may be deposited from a solution. Examples of suitable methods include sol-gel, layer-by-layer deposition, polymer adsorption, surface initiated polymerization, nanoparticles adsorption, spray drying, and others.

In some designs, the protective layer or protective shells (coating(s)) may comprise carbon. In some designs, the carbon content in the coating may range from about 10 wt. % to about 100 wt. %.

Several material compositions may be suitable for use in a skeleton matrix of the type described herein, including but not limited to: metals and semimetals, polymers (including polymers that are electrically conductive within the cathode operational potential range), oxides, carbides (including ternary and other mixed carbides), oxy-carbides (including partially fluorinated ones), oxy-fluorides, various intercalation-type cathode materials, metal nitrides, carbons (including partially or fully fluorinated ones, such as carbon fluorides), carbon oxy-fluorides, and others. In some designs, it may be advantageous for the skeleton matrix material to be in the form of individual, monolithic (single-bodied) particles. In some designs, the skeleton matrix material may comprise from about 0.05 at. % to about 50 at. % fluorine (F). In some designs (e.g., when chemical lithiation is used), at least a portion of this F may be converted to LiF during the lithiation step of the composite cathode synthesis. In some designs, it may be further advantageous (e.g., for maximizing energy density of the cathodes) for the volume fraction of the skeleton matrix material in the individual "skeleton matrix material—lithium fluoride—metal composite" particles not to exceed 35-40 vol. %, more preferably not to exceed 25-30 vol. %, and even more preferably not to exceed 15-20 vol. %. However, when its volume fraction becomes too small (e.g., smaller than about 3-5 vol. %) the functionality of the skeleton matrix material may typically be undesirably reduced. In some designs, it may be further advantageous for the skeleton matrix material particles to exhibit characteristic dimensions in the range of about 20 nm to about 20 microns. Larger particles are easier to handle during the slurry preparation, but too large particles (the size of which depends on the cell chemistry and operating conditions, but typically below about 20 microns) may reduce rate performance below the minimum (for a given application) value. In some designs, if porous skeleton matrix particles are used, the characteristic dimensions of the majority (e.g., above about 70 vol. %) of the skeleton matrix material pores (which may be completely or partially filled with active materials, such as a mixture of LiF and metals, metal fluorides, etc.) may preferably be in the range of about 1 nm to about 100 nm. In some designs, if porous skeleton matrix particles are used, the volume of pores within such particles may preferably be in the range of about 60 vol. % to about 95 vol. %. In some designs, at least some of the pores within the skeleton matrix material may be produced using sacrificial template materials (e.g., a sacrificial polymer, sacrificial metal, or sacrificial salt particles). The pores within the skeleton matrix material may be straight or curved and may be of various shapes (e.g., mostly slit shape, cylindrical shape, spherical shape, or have some other shape, including irregularly-shaped curved pores). If the pores are of elongated or slit shape, the orientation of such pores may depend on the skeleton particle preparation and may vary within a single particle. For example, in the center of the particles the pores may be oriented randomly or along the radius, while closer to the surface the pores may be oriented parallel to the surface of the particles. In this case one may achieve superior mechanical properties and, in some cases, simplify formation of the protective coatings or shells, which may serve to stabilize the metal or metal fluorides against irreversible changes and undesirable interactions with electrolyte. In some designs, porous skeleton matrix material particles may have smaller pores closer to the particle surface. In this case one may achieve superior mechanical properties and, in some cases, simplify formation of the protective coatings or shells. In some designs, porous skeleton matrix material particles may exhibit a smaller pore volume closer to the particle surface. In this case one may achieve superior mechanical properties and, in some cases, simplify formation of the protective coatings or shells. In some designs, when metal fluorides infiltrated in the pores of the porous skeleton matrix material undergo chemical lithiation, the skeleton matrix material may become irreversibly deformed without substantial changes in the mechanical integrity of the composite particles. In some designs (e.g., when either metal fluorides or a mixture of metal and LiF are infiltrated in the pores of the porous skeleton matrix material) the volume changes upon repeated electrochemical cycling of such composites may be accommodated mostly by reversible elastic deformations (e.g., by over 50% elastic deformation after cycle 5 and by over 90% elastic deformation after cycle 50); in this case high stability of cells may be achieved.

In some designs, skeleton matrix material particles may have conductive additives (e.g., carbon black particles, carbon nanotubes, graphene, exfoliated graphite, carbon fibers, etc.) strongly (e.g., chemically) bonded to its outer surface in order to enhance stability of the electrode during electrochemical cycling.

As discussed above, in one example, porous carbon may serve as an electrically conductive skeleton matrix material. Porous carbons having most of the pore walls being a monolayer-thick have been found to work particularly well, providing both high pore volume and sufficiently high conductivity, while minimizing the volume that "inactive" carbon atoms occupy. Porous carbons with experimentally measured Brunauer, Emmett and Teller (BET) specific surface area above 500 $m^2/g$ (more preferably above 1000 $m^2/g$, even more preferably above 1500 $m^2/g$) have been found to work well as a skeleton matrix material. An example of a high surface porous carbon is activated carbon. It may be produced by pyrolysis of carbon-containing organic precursors, followed by its either chemical or physical activation (partial oxidation of the resulting carbon to enhance its pore volume and specific surface area). Conventionally produced activated carbon particles often exhibit a majority of pores in the range from 0.3 nm to 100 nm. In some designs, those porous carbons that have a majority of pores (preferably more than 70% by volume) in the range from about 1 nm to about 50 nm may be particularly useful as a skeleton matrix material. In some designs, porous carbon skeleton matrix particles may be heated (in vacuum or inert environment) to temperatures of about 700° C. to about 2000° C. to enhance their electrical conductivity, their resistance to fluorination, or their mechanical strength.

In order to achieve a high energy cell (and often the lowest cost per unit energy in such cells and most favorable performance), when a battery is constructed with the cathode comprising mixed LiF and metal compositions and exhibiting a high volumetric capacity (e.g., above about 700 mAh/cc on the electrode level, more preferably above about 800 mAh/cc, even more preferably above about 900 mAh/cc, even more preferably above about 1000 mAh/cc), in some designs it may be preferred for the battery anode to also exhibit comparably high (or higher) volumetric capacity (e.g., above about 800 mAh/cc, even more preferably above about 900 mAh/cc, and in some designs more preferably above about 1000 mAh/cc or even above about 1100 mAh/cc). In some designs, it may be preferable for such high capacity anodes to comprise Si. In some designs, such high capacity anodes may comprise 30 at. % of Si or more. In some designs, such high capacity anodes may comprise 5 at. % of C or more in order to achieve better stability and higher rates. In some designs, it may be preferable for such high capacity anodes to comprise Li in order to further enhance cell energy density. In some designs, such high capacity anodes may comprise 3 at. % of Li or more.

The description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A Li or Li-ion battery electrode composition comprising:
    a powder or slurry comprising a composite particle that includes:
    a mixture of metal and lithium fluoride (LiF) materials capable of storing and releasing Li ions during battery operation;
    a skeleton matrix material into which the mixture is embedded to form an active material core; and
    a Li-ion permeable shell at least partially encasing the active material core and protecting the metal and LiF materials from interaction with a battery electrolyte.

2. The battery electrode composition of claim 1, wherein the composite particle is of a substantially-spherical shape and exhibits a diameter in the range of about 50 nm to about 10 microns.

3. The battery electrode composition of claim 1, wherein the Li-ion permeable shell has an average shell thickness in the range of about 1 nm to about 100 nm.

4. The battery electrode composition of claim 1, wherein the skeleton matrix material makes up a volume fraction of the composite particle in the range of about 3 vol. % to about 40 vol. %.

5. The battery electrode composition of claim 4, wherein the volume fraction of the skeleton matrix material near the perimeter of the composite particle is at least 10% larger than in the center of the composite particle.

6. The battery electrode composition of claim 1, wherein the skeleton matrix material is in the form of a monolithic particle.

7. The battery electrode composition of claim 1, wherein the skeleton matrix material comprises about 20 at. % to about 100 at. % carbon.

8. The battery electrode composition of claim 1, wherein the skeleton matrix material comprises more than about 0.05 at. % fluorine.

9. The battery electrode composition of claim 1, wherein the metal of the mixture comprises at least 10 at. % Cu and at most 90 at. % of at least one of the following: Fe, Co, Ni, Ti, Zn, Bi, Pb, Sb, Sn, Cd, Cr, Zr, Nb, Mo, Hf, Ta, Si, La, or Ce.

10. The battery electrode composition of claim 1, wherein the Li-ion permeable shell is a composite material that has at least two components.

11. The battery electrode composition of claim 1, wherein the Li-ion permeable shell comprises about 20 at. % to about 100 at. % carbon.

12. The battery electrode composition of claim 1, wherein the composite particle further comprises one or more functional groups forming a coating on the Li-ion permeable shell.

13. A Li or Li-ion battery, comprising:
    anode and cathode electrodes, wherein the cathode electrode comprises the battery electrode composition of claim 1;
    an electrolyte ionically coupling the anode and cathode electrodes; and
    a separator electrically separating the anode and cathode electrodes.

14. A method of fabricating a Li or Li-ion battery electrode composition comprising a composite particle, the method comprising:
    embedding one or more metal, metal oxide, or metal salt precursors into a skeleton matrix material;
    inducing conversion of the one or more precursors into a metal fluoride embedded into the skeleton matrix material via a fluorination reaction to form an active material core; and
    after the inducing, at least partially encasing the active material core with a Li-ion permeable shell to protect the active material core from interaction with a battery electrolyte,
    wherein, after the inducing, the at least partially encased active material core is arranged as a powder or as part of a slurry.

15. The method of claim 14, wherein the one or more precursors comprise a mixture of two different precursor compositions.

16. The method of claim 14, wherein a plasma source is utilized for the formation of fluorine radicals involved in the fluorination reaction.

17. The method of claim 14, further comprising chemical lithiation of the metal fluoride embedded into the skeleton matrix material.

18. The method of claim 17, wherein the chemical lithiation proceeds by using one or more chemical lithiation reagents that are soluble in organic solvents.

19. The method of claim 18, wherein the one or more chemical lithiation reagents comprise at least one of the following: (i) a lithium alkylborohydride, (ii) an alkyllithium magnesate, (iii) a radical anion of polycyclic aromatic hydrocarbons, (iv) a lithium ketone radical anion, or (v) a lithium aluminum hydride.

20. The method of claim 18, wherein the one or more chemical lithiation reagents comprise (i) lithium borohydride or (ii) an alkyllithium reagent.

21. The method of claim 18, wherein the fluorination reaction comprises using a non-lithium-containing reducing agent to reduce metal ions in a metal fluoride composition to a corresponding metallic state and a separate lithium-containing salt to provide lithium ions to form lithium fluoride (LiF).

* * * * *